US012568130B2

(12) United States Patent

Kumar Agrawal et al.

(10) Patent No.:  US 12,568,130 B2

(45) **Date of Patent:       *Mar. 3, 2026**

(54) METHODS, SYSTEMS, AND DEVICES FOR PRESENTING CONTENT SELECTION AND VERIFICATION PRESENTATIONS IN A VIDEOCONFERENCE

(71) Applicant: Motorola Mobility LLC, Chicago, IL (US)

(72) Inventors: Amit Kumar Agrawal, Bangalore (IN); Alexandre Neves Creto, Sao Jose dos Campos (BR)

(73) Assignee: Motorola Mobility LLC, Chicago, IL (US)

( * ) Notice: Subject to any disclaimer, the term of this patent is extended or adjusted under 35 U.S.C. 154(b) by 74 days.

This patent is subject to a terminal disclaimer.

(21) Appl. No.: 18/384,653

(22) Filed: Oct. 27, 2023

(65) Prior Publication Data

US 2024/0056493 A1      Feb. 15, 2024

Related U.S. Application Data

(63) Continuation of application No. 17/534,193, filed on Nov. 23, 2021, now Pat. No. 11,843,644.

(51) Int. Cl.
H04L 65/403          (2022.01)
G06F 3/0482          (2013.01)
(Continued)

(52) U.S. Cl.
CPC .......... H04L 65/403 (2013.01); G06F 3/0482 (2013.01); G06F 3/1454 (2013.01); H04N 7/15 (2013.01)

(58) Field of Classification Search
None
See application file for complete search history.

(56) References Cited

U.S. PATENT DOCUMENTS 9,996,367 B1      6/2018  Bao et al.
10,120,541 B2    11/2018  Shaw
(Continued)

FOREIGN PATENT DOCUMENTS

CN         113676690        11/2021
JP         2022164097       10/2022

OTHER PUBLICATIONS

"AR Smart Glasses: Applications, Challenges & Future Potential [2022]", Intuz Blog; Published Oct. 28, 2021; https://www.intuz.com/blog/augmented-reality-glass-application-usecases-challenges-future-potential.

(Continued)

*Primary Examiner* — Quoc D Tran
(74) *Attorney, Agent, or Firm* — Philip H. Burrus, IV

(57)                    ABSTRACT

A method in a conferencing system terminal device includes detecting, with one or more processors during a videoconference, a communication device electronically in communication with both a content presentation companion device having a display and one or more remote electronic devices engaged in the videoconference. User input requesting for content to be shared from the conferencing system terminal device with the one or more remote electronic devices engaged in the videoconference is received. Prior to causing the communication device to share the content with the one or more remote electronic devices during the videoconference the one or more processors present, on the display of the content presentation companion device, a content verification presentation and receive a content share confirmation in response to the content verification presentation.

20 Claims, 14 Drawing Sheets

(51) Int. Cl.
    *G06F 3/14*          (2006.01)
    *H04N 7/15*         (2006.01)

(56)          References Cited

U.S. PATENT DOCUMENTS

| | | | | |
|---|---|---|---|---|
| 11,012,445 | B1 * | 5/2021 | Jamison | H04W 4/08 |
| 11,146,601 | B1 | 10/2021 | Silverstein | |
| 11,652,957 | B1 * | 5/2023 | Sculley | H04L 65/403 |
| | | | | 348/14.02 |
| 11,843,644 | B2 * | 12/2023 | Kumar Agrawal | G06F 1/1686 |
| 2011/0252366 | A1 | 10/2011 | Balasubramanian | |
| 2012/0274728 | A1 | 11/2012 | Yasoshima | |
| 2014/0366091 | A1 | 12/2014 | Savage | |
| 2015/0256567 | A1 | 9/2015 | Lian | |
| 2016/0232336 | A1 * | 8/2016 | Pitschel | G06F 21/305 |
| 2017/0053447 | A1 | 2/2017 | Chen | |
| 2019/0364245 | A1 | 11/2019 | Kim | |
| 2020/0356221 | A1 | 11/2020 | Behzadi | |
| 2020/0389675 | A1 | 12/2020 | Kum | |
| 2022/0094379 | A1 * | 3/2022 | Balderston | A45F 5/1516 |
| 2022/0191259 | A1 | 6/2022 | Leppanen | |
| 2022/0230399 | A1 | 7/2022 | Evangelista | |
| 2022/0236942 | A1 * | 7/2022 | Wu | G06F 3/1454 |
| 2022/0337780 | A1 | 10/2022 | Huang | |
| 2023/0005224 | A1 | 1/2023 | Cudak | |
| 2023/0071584 | A1 | 3/2023 | Lebeau | |
| 2023/0164202 | A1 * | 5/2023 | Kumar Agrawal | G06F 1/1686 |
| | | | | 348/14.03 |

OTHER PUBLICATIONS

Anwah, Olisa , "Notice of Allowance", U.S. Appl. No. 17/534,199, filed Nov. 23, 2021; Mailed Jun. 5, 2023.

Tran, Quoc Duc , "Notice of Allowance", U.S. Appl. No. 17/534,193, filed Nov. 23, 2021; Mailed Sep. 20, 2023.

Tran, Quoc Duc , "Non-Final Office Action", U.S. Appl. No. 17/534,193, filed Nov. 23, 2021; Mailed Jun. 8, 2023.

Tucker, Adam , "GB Search Report", GB2215023.9; Mailed Mar. 28, 2023.

\* cited by examiner

METHODS, SYSTEMS, AND DEVICES FOR PRESENTING CONTENT SELECTION AND VERIFICATION PRESENTATIONS IN A VIDEOCONFERENCE

CROSS REFERENCE TO PRIOR APPLICATIONS

This application is a continuation application claiming priority and benefit under 35 U.S.C. § 120 from U.S. application Ser. No. 17/534,193, filed Nov. 23, 2021, which is incorporated by reference for all purposes.

BACKGROUND

Technical Field

This disclosure relates generally to electronic devices, and more particularly to electronic devices capable of providing video conferencing features.

Background Art

Many modern electronic devices, including smartphones, tablet computers, and laptop computers, are equipped to engage in videoconferences with other electronic devices across a network. Users employ such devices to communicate with friends, family, and work colleagues. This is especially true during times of pandemic, when people work remotely rather than going to a centralized office. Participants engage videoconferencing to engage in real-time discussions and share electronic content. Videoconferencing additionally offers participants the ability to see other participants via video feeds streamed to the participating electronic devices.

During videoconferences, people frequently elect to share content in addition to video feeds depicting their visage and audio feeds including their voices. Illustrating by example, a videoconference participant may elect to share a slide deck, images, or videos with the other participants. Sometimes, a participant will simply share their entire local desktop with the other participants. The latter situation frequently arises when a person sharing content needs to navigate through multiple windows during the content share.

When sharing content in this manner, a participant can inadvertently reveal information that is personal, confidential, or otherwise should not be shared. For instance, a videoconference participant sharing a desktop may inadvertently make personal email or sensitive or confidential documents visible to the other participants while navigating between windows to be shared. It would be advantageous to have an improved methods, systems, and devices to eliminate these situations while maintaining a simple and efficient content sharing process.

BRIEF DESCRIPTION OF THE DRAWINGS

The accompanying figures, where like reference numerals refer to identical or functionally similar elements throughout the separate views and which together with the detailed description below are incorporated in and form part of the specification, serve to further illustrate various embodiments and to explain various principles and advantages all in accordance with the present disclosure.

Figure 1:
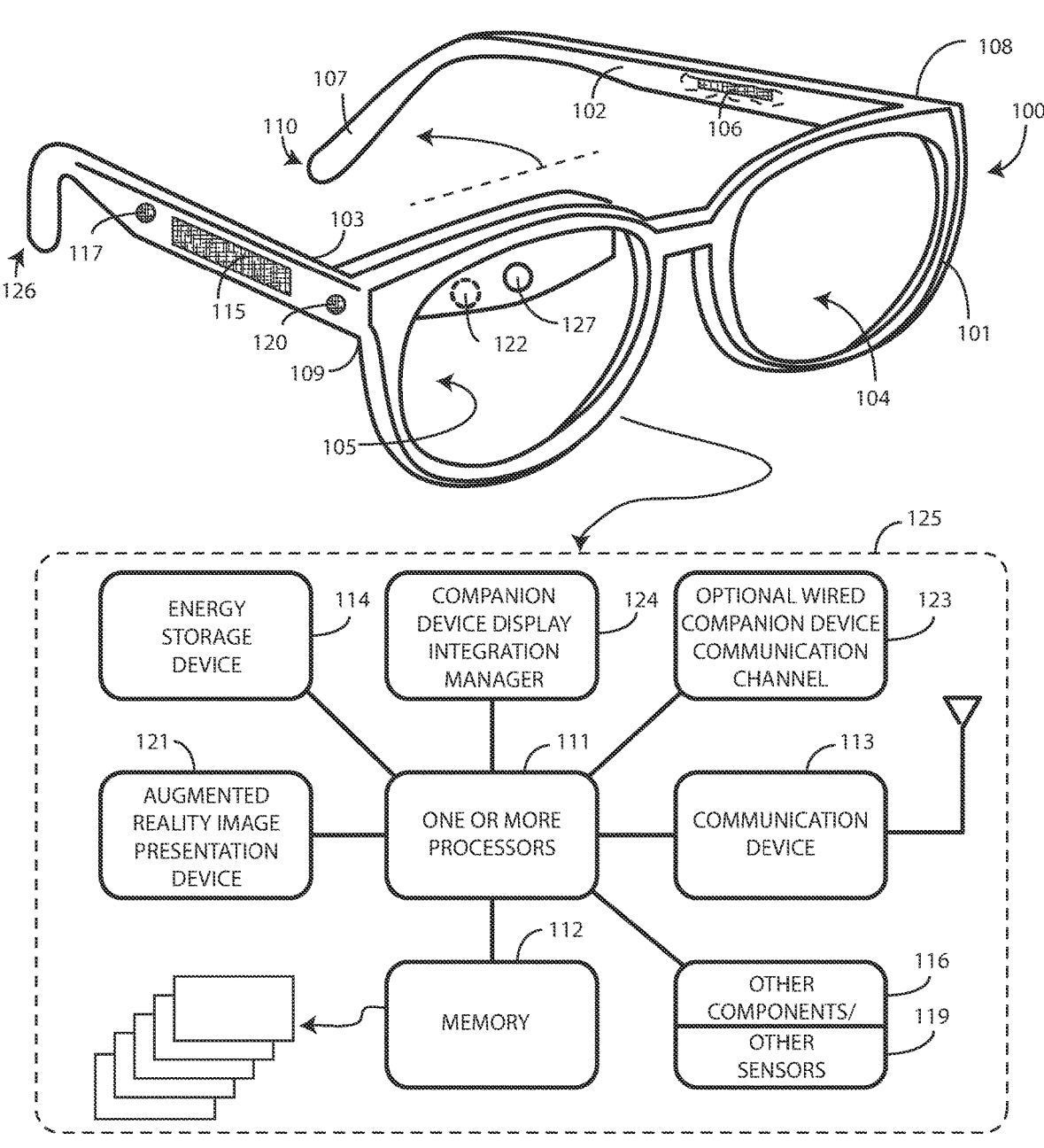
FIG. 1 illustrates one explanatory augmented reality companion device in accordance with one or more embodiments of the disclosure.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present disclosure.

DETAILED DESCRIPTION OF THE DRAWINGS

Before describing in detail embodiments that are in accordance with the present disclosure, it should be observed that the embodiments reside primarily in combinations of method steps and apparatus components related to presenting, prior to sharing content in a videoconference on either on the display of a content presentation companion device or within a field of view of an augmented reality companion device, a content verification presentation and receiving, with a user interface of the content presentation companion device or augmented reality companion device, a content share confirmation in response to presenting the content verification presentation. Any process descriptions or blocks in flow charts should be understood as representing modules, segments, or portions of code that include one or more executable instructions for implementing specific logical functions or steps in the process.

Alternate implementations are included, and it will be clear that functions may be executed out of order from that shown or discussed, including substantially concurrently or in reverse order, depending on the functionality involved. Accordingly, the apparatus components and method steps have been represented where appropriate by conventional symbols in the drawings, showing only those specific details that are pertinent to understanding the embodiments of the present disclosure so as not to obscure the disclosure with details that will be readily apparent to those of ordinary skill in the art having the benefit of the description herein.

Embodiments of the disclosure do not recite the implementation of any commonplace business method aimed at processing business information, nor do they apply a known business process to the particular technological environment of the Internet. Moreover, embodiments of the disclosure do not create or alter contractual relations using generic computer functions and conventional network operations. Quite to the contrary, embodiments of the disclosure employ methods that, when applied to electronic device and/or user interface technology, improve the functioning of the electronic device itself by and improving the overall user experience to overcome problems specifically arising in the realm of the technology associated with electronic device user interaction.

It will be appreciated that embodiments of the disclosure described herein may be comprised of one or more conventional processors and unique stored program instructions that control the one or more processors to implement, in conjunction with certain non-processor circuits, some, most, or all of the functions of presenting a content verification presentation using a content presentation companion device or augmented reality companion device and, thereafter, receiving a content share confirmation prior to sharing any content with other participants of a videoconference as described herein. The non-processor circuits may include, but are not limited to, a radio receiver, a radio transmitter, signal drivers, clock circuits, power source circuits, and user input devices. As such, these functions may be interpreted as steps of a method to perform the presentation of content verification presentation and/or the receipt of content share confirmation in response to the presentation of the content verification presentation to ensure that only the proper content is shared with other participants of a videoconference.

Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used. Thus, methods and means for these functions have been described herein. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ASICs with minimal experimentation.

Embodiments of the disclosure are now described in detail. Referring to the drawings, like numbers indicate like parts throughout the views. As used in the description herein and throughout the claims, the following terms take the meanings explicitly associated herein, unless the context clearly dictates otherwise: the meaning of "a," "an," and "the" includes plural reference, the meaning of "in" includes "in" and "on." Relational terms such as first and second, top and bottom, and the like may be used solely to distinguish one entity or action from another entity or action without necessarily requiring or implying any actual such relationship or order between such entities or actions.

As used herein, components may be "operatively coupled" when information can be sent between such components, even though there may be one or more intermediate or intervening components between, or along the connection path. The terms "substantially", "essentially", "approximately", "about" or any other version thereof, are defined as being close to as understood by one of ordinary skill in the art, and in one non-limiting embodiment the term is defined to be within ten percent, in another embodiment within five percent, in another embodiment within 1 percent and in another embodiment within one-half percent. The term "coupled" as used herein is defined as connected, although not necessarily directly and not necessarily mechanically. Also, reference designators shown herein in parenthesis indicate components shown in a figure other than the one in discussion. For example, talking about a device (10) while discussing figure A would refer to an element, 10, shown in figure other than figure A.

In response to the COVID-19 pandemic, never before have employees worked remotely on such a massive scale. When millions of companies went fully remote in a short period of time to slow the spread of the Coronavirus Disease 2019, videoconferencing became the logical solution for connecting the remote workforce and keeping teams productive from home. In a matter of weeks, video conferencing usage exploded, permeating nearly all aspects of professional and personal life. In addition to business-related meetings, remote teams around the globe began using video conferencing to host virtual happy hours, ice breaker activities, online games, wine tastings, birthday parties, and other social activities.

Many modern personal electronic communication devices, such as notebook computers, tablet computers, desktop computers, mobile phones, and even smart watches and augmented reality glasses, are utilized to participate in videoconferences with other remote participants. During a typical videoconference, a participant may choose to share on-screen content, such as a desktop view or an open application window, with the other participants of the videoconference. This content share can be in addition to, or instead of, providing video feeds depicting the participant's visage.

Embodiments of the disclosure contemplate that when a participant intends to share content from more than one application or that is presented in more than one window, rather than individually selecting each window or application to be shared, the participant will instead just share their entire local desktop. However, when doing so, that participant may inadvertently reveal information actively being presented on the desktop that is personal or confidential. For example, a user may unintentionally share personal email communications or sensitive and/or confidential enterprise documents that just happen to be visible on the desktop when the participant initiates the share.

Existing videoconference software solutions share the participant's desktop identically with all other participants in the videoconference. However, in addition to the fact that some of the shared content may be of a personal nature, even when this is not so it is frequently the case that some participants in the videoconference may not have authorization to view some of the shared content. The sharing participant may further be unaware of particular access privileges of the other participants in the videoconference. The sharing participant may simply be unaware that personal and/or confidential information happens to be visible on the desktop when the share is initiated. Additionally, during a share event a user may also inadvertently open additional personal or confidential content that at least one other participant should not view.

Advantageously, embodiments of the disclosure provide a solution to these and other problems arising when content sharing operations are initiated during a videoconference. In one or more embodiments, one or more processors detect, during a videoconference, a communication device electronically in communication with both a content presentation companion device having a display and one or more remote electronic devices engaged in the videoconference. When a participant in the videoconference desires to share content with others, the one or more processors receive, with a user interface, user input requesting for the content to be shared from the conferencing system terminal device with the one or more remote electronic devices engaged in the videoconference.

However, in contrast to prior art systems that immediately make the content available for viewing by others, prior to causing the communication device to share the content with the one or more remote electronic devices during the videoconference, the one or more processors present, on the display of the content presentation companion device, a content verification presentation. To confirm the content included with the content verification presentation is indeed content that a participant desires to share, the one or more processors preclude any sharing until a content share confirmation is received, by another user interface of the content presentation companion device, in response to the content verification presentation. In one or more embodiments, only after the content share confirmation is received do the one or more processors share the content with the other participants of the videoconference.

Embodiments of the disclosure work well when the content presentation companion device is an augmented reality companion device. Illustrating by example, if the content presentation companion device comprises augmented reality glasses, in response to receiving, with a user interface, user input requesting for content to be shared from the conferencing system terminal device with the one or more remote electronic devices engaged in the videoconference and prior to causing the communication device to share the content with the one or more remote electronic devices during the videoconference, the one or more processors can presenting, in a field of view of the augmented reality glasses, the content verification presentation. The one or more processors can then receive, with a user interface of the conferencing system terminal device or the augmented reality glasses, a content share confirmation in response to the content verification presentation.

In one or more embodiments, when the content presentation companion device is configured as an augmented reality companion device, images of the content verification presentation are presented within a field of view of the augmented reality glasses in a carousel presentation around the conferencing system terminal device. In one or more embodiments, the participant can select the shared content via a gesture, gaze, mouse click, or other user input. The one or more processors can then cause a communication device of the conferencing system terminal device to share the selected content with one or more remote electronic devices during the videoconference in response to receiving the content share confirmation.

In one or more embodiments, one or more processors of a conferencing system terminal device detect that a videoconference participant is operating a conferencing system terminal device that is in communication with a content presentation companion device. The content presentation companion device could take many forms, including that of a stand-alone monitor, a companion tablet computer, a companion smartphone, a companion smartwatch, or other connected device that includes a display. The content presentation companion device can include its own processor and operating system capabilities in some embodiments. In other embodiments, it will not.

The system then detects that the videoconference participant is engaged in an active videoconference with content being shared by the participant within a shared space of the videoconference that is viewable by at least one other participant of the videoconference. The shared space defines a visible area of content that is generally viewable by receiving participants during the videoconference unless obscured by any known or proprietary mechanisms.

In one or more embodiments, the system then determines that the videoconference participant would like to share additional content other than what is being currently shared. In one or more embodiments, one or more processors of the conferencing system terminal device then move all the active windows and/or a file explorer option to the display of the content presentation companion device so that the participant intending to share the content can privately preview the content and/or choose new content to be shared in the shared space of the videoconference. In one or more embodiments, this information presented on the display of the content presentation companion device in the form of a content verification presentation.

Once a content share confirmation is received in response to the content verification presentation, the system can move the active window selection from the display of the content presentation companion device to the shared space of the videoconference. Advantageously, presenting the content verification presentation on the display of the content presentation companion device avoids any obscuration or restriction of the content currently being shared with the other videoconference participants. The system does this by keeping the "to be shared" content to remain private and visible only to the participant requesting the share until the content share confirmation is received. Once the content share confirmation is received, the shared content is moved to the shared space and made visible to the remainder of the participants.

When the content presentation companion device is configured as an augmented reality companion device having a field of view wider than the conferencing system terminal device with which the augmented reality companion device is in communication, additional features can be provided. In one or more embodiments, the system initially detects that a videoconference participant is operating a conferencing system terminal device that is in communication with an augmented reality companion device such as a pair of connected augmented reality glasses. The system detects that the videoconference participant is actively engaged in a videoconference with content being shared within the shared space of the videoconference.

While this initial content is being shared, the system determines that the videoconference participant would like to share additional data other than what is presently being shared. In one or more embodiments, the one or more processors of the conferencing system terminal device then move all the active windows and/or a file explorer option into a field of view of the augmented reality companion device that is non-overlapping with the conferencing system terminal device with which the augmented reality companion device is operating. In one or more embodiments, these images are presented in a carousel presentation within the field of view of the augmented reality companion device that at least partially encircles the view of the conferencing system terminal device. From this carousel presentation, the videoconference participant can choose a new active window to be shared in the shared space. In one or more embodiments, the carousel presentation is presented as a content verification presentation.

Presenting these available options to the user in the field of view of the augmented reality companion device in a non-overlapping manner with the conferencing system terminal device—rather than in the shared space of the videoconference—prevents the available options from obscuring or restricting the content currently being shared in the shared space while the selection is being made. Once the sharing participant provides a content share confirmation in response to the content verification presentation, which can be in the form of a gesture, a gaze, or other selection of the content offerings, the system causes a communication device of the conferencing system terminal device to share the selected content with the other participants of the videoconference.

Advantageously, moving the active window selection to the field of view of the augmented reality companion device allows unshared content to remain private to the sharing participant of the videoconference until the content share confirmation is delivered. Once the content share confirmation is delivered, the selected content can be moved to the shared space and made viewable to the other participants of the videoconference.

Turning now to FIG. 1, illustrated therein is one explanatory augmented reality companion device 100 configured in accordance with one or more embodiments of the disclosure. In the illustrative embodiment of FIG. 1, the augmented reality companion device 100 comprises augmented reality glasses. However, this is for explanatory purposes only, as the augmented reality companion device 100 could be configured in any number of other ways as well. Illustrating by example, the augmented reality companion device 100 could also be configured as any of sunglasses, goggles, masks, shields, or visors. Other forms of the augmented reality companion device 100 will be obvious to those of ordinary skill in the art having the benefit of this disclosure.

The augmented reality companion device 100 of FIG. 1 includes a frame 101 and one or more stems 102,103. Here, the one or more stems 102,103 comprise a first stem 102 and a second stem 103. One or more lenses 104,105 can be disposed within the frame 101. The lenses 104,105 can be prescription or non-prescription, and can be clear, tinted, or dark.

In one or more embodiments the stems 102,103 are pivotable from a first position where they are situated adjacent to, and parallel with, the frame 101, to a second, radially displaced open position shown in FIG. 1. However, in other embodiments the stems 102,103 may be fixed relative to the frame 101. In still other embodiments, such as might be the case if the augmented reality companion device 100 were configured as goggles, the stems 102,103 may be flexible or soft. For example, the stems of goggles are frequently elasticized fabric, which is soft, flexible, pliable, and stretchy. Other types of stems 102,103 will be obvious to those of ordinary skill in the art having the benefit of this disclosure.

In one or more embodiments the stems 102,103 attach to the frame 101 at a first end 108,109 and extend distally from the frame 101 to a second, distal end 110,126. In one embodiment, each stem 102,103 includes a temple portion 106 and an ear engagement portion 107. The temple portion 106 is the portion of the stem 102,103 passing from the frame 101 past the temple of a wearer, while the ear engagement portion 107 engages the wearer's ear to retain the augmented reality glasses to the wearer's head.

Since the augmented reality companion device 100 is configured as an electronic device, one or both of the frame 101 and the stems 102,103 can comprise one or more electrical components. These electrical components are shown illustratively in a schematic block diagram 125 in FIG. 1. It will be clear to those of ordinary skill in the art having the benefit of this disclosure that the electrical components and associated modules can be used in different combinations, with some components and modules included and others omitted. Components or modules can be included or excluded based upon need or application.

The electronic components can include one or more processors 111. The one or more processors 111 can be disposed in one or both of the stems 102,103 or the frame 101. The one or more processors 111 can be operable with a memory 112. The one or more processors 111, which may be any of one or more microprocessors, programmable logic, application specific integrated circuit device, or other similar device, are capable of executing program instructions and methods described herein. The program instructions and methods may be stored either on-board in the one or more processors 111, or in the memory 112, or in other computer readable media coupled to the one or more processors 111.

The one or more processors 111 can be configured to operate the various functions of the augmented reality companion device 100, and also to execute software or firmware applications and modules that can be stored in a computer readable medium, such as memory 112. The one or more processors 111 execute this software or firmware, in part, to provide device functionality. The memory 112 may include either or both static and dynamic memory components, may be used for storing both embedded code and user data.

In one or more embodiments, the augmented reality companion device 100 also includes an optional wireless communication device 113. Where included, the wireless communication device 113 is operable with the one or more processors 111 and is used to facilitate electronic communication with one or more electronic devices or servers or other communication devices across a network. Note that it is possible to combine the one or more processors 111, the memory 112, and the wireless communication device 113 into a single device, or alternatively into devices having fewer parts while retaining the functionality of the constituent parts.

The wireless communication device 113, which may be one of a receiver or transmitter and may alternatively be a transceiver, operates in conjunction with the one or more processors 111 to electronically communicate through a communication network. For example, in one embodiment, the wireless communication device 113 can be configured to communicate through a traditional cellular network. Other examples of networks with which the communication circuit may communicate include proprietary networks and direct communication networks. In other embodiments, the wireless communication device 113 can communicate with near field or local area networks, infrared communication circuits, magnetic field modulation circuits, and Wi-Fi circuits. In one or more embodiments, the wireless communication device 113 can be configured to provide messaging functionality to deliver electronic messages to remote devices.

A battery 114 or other energy storage device can be included to provide power for the various components of the augmented reality companion device 100. While a battery 114 is shown in FIG. 1, it will be obvious to those of ordinary skill in the art having the benefit of this disclosure that other energy storage devices can be used instead of the battery 114, including a micro fuel cell or an electrochemical capacitor. The battery 114 can include a lithium-ion cell, lithium polymer cell, or a nickel metal hydride cell, such cells having sufficient energy capacity, wide operating temperature range, large number of charging cycles, and long useful life. The battery 114 may also include overvoltage and overcurrent protection and charging circuitry. In one embodiment, the battery 114 comprises a small, lithium polymer cell.

In one or more embodiments, a photovoltaic device 115, such as a solar cell, can be included to recharge the battery 114. In one embodiment, the photovoltaic device 115 can be disposed along the temple portion 106 of the stems 102,103. In this illustrative embodiment, two solar cells are disposed in the temple portion 106 of each stem 102,103, respectively.

Other components 116 can be optionally included in the augmented reality companion device 100 as well. For example, in one embodiment one or more microphones can be included as audio capture devices 117. These audio capture devices can be operable with the one or more processors 111 to receive voice input. Additionally, in one or more embodiments the audio capture devices 117 can capture ambient audio noise. Signals corresponding to captured audio can be transmitted to an electronic device in communication with the augmented reality companion device 100 or a server or cloud-computing device. The other component 116 can additionally include loudspeakers for delivering audio content to a user wearing the augmented reality companion device 100.

The other components 116 can also include a motion generation device for providing haptic notifications or vibration notifications to a user. For example, a piezoelectric transducer, rotational motor, or other electromechanical device can be configured to impart a force or vibration upon the temple portion 106 of the stems 102,103, or alternatively along the frame 101. The motion generation device can provide a thump, bump, vibration, or other physical sensation to the user. The one or more processors 111 can be configured to actuate the motion generation device to deliver a tactile or vibration output alone or in combination with other outputs such as audible outputs.

Similarly, in one or more embodiments the augmented reality companion device 100 can include a video capture device 127 such as an imager. The imager can be disposed within the frame 101 or stems 102,103. In one or more embodiments, the video capture device 127 can function as a to detect changes in optical intensity, color, light, or shadow in the near vicinity of the augmented reality companion device 100. As with the audio capture device 117, captured video information can be transmitted to an electronic device, a remote server, or cloud-computing device.

Other sensors 119 can be optionally included in the augmented reality companion device 100. One example of such a sensor is a global positioning system device for determining where the augmented reality companion device 100 is located. The global positioning system device can communicate with a constellation of earth orbiting satellites or a network of terrestrial base stations to determine an approximate location. While a global positioning system device is one example of a location determination module, it will be clear to those of ordinary skill in the art having the benefit of this disclosure that other location determination devices, such as electronic compasses or gyroscopes, could be used as well.

The other sensors 119 can also include an optional user interface. The user interface can be used, for example, to activate the circuit components or turn them OFF, control sensitivity of the other sensors 119, receive user input, and so forth. The user interface, where included, can be operable with the one or more processors 111 to deliver information to, and receive information from, a user. The user interface can include a rocker switch, slider pad, button, touch-sensitive surface, or other controls, and optionally a voice command interface. These various components can be integrated together.

In one or more embodiments, an audio output device 120, such as a loudspeaker or other transducer, can deliver audio output to a user. For example, piezoelectric transducers can be operably disposed within the stems 102,103. Actuation of the piezoelectric transducers can cause the stems 102,103 to vibrate, thereby emitting acoustic output. More traditional audio output devices 120, such as loudspeakers, can be used as well.

The other components 116 can optionally include a haptic device providing haptic feedback to a user. The haptic device can include a motion generation device to deliver a tactile response to the user. For example, a piezoelectric transducer or other electromechanical device can be included in the stems 102,103. The transducer can actuate to impart a force upon the user's head to provide a thump, bump, vibration, or other physical sensation to the user. The inclusion of both the audio output device 120 and the haptic device allows both audible and tactile feedback to be delivered.

In one or more embodiments, the augmented reality companion device 100 includes an augmented reality image presentation device 121 operable to deliver augmented reality imagery to a user. The augmented reality image presentation device 121 can be operable with a projector 122. In the illustrative embodiment of FIG. 1, the frame 101 supports the projector 122. In one or more embodiments the projector 122 is configured to deliver images to a holographic optical element when the augmented reality companion device 100 is operating in an augmented reality mode of operation.

In one embodiment, the projector 122 is a modulated light projector operable to project modulated light images along a surface or holographic optical element. In another embodiment, the projector 122 is a thin micro projector. In another embodiment, the projector 122 can comprise a laser projector display module. Other types of projectors will be obvious to those of ordinary skill in the art having the benefit of this disclosure.

In one or more embodiments, the projector 122 can include a lens and a spatial light modulator configured to manipulate light to produce images. The projector 122 can include a light source, such as a single white light emitting diode, multiple separate color light emitting diodes, or multiple separate color laser diodes that deliver visible light to the spatial light modulator through a color combiner. The augmented reality image presentation device 121 can drive the spatial light modulator to modulate the light to produce images. The spatial light modulator can be optically coupled (e.g., by free space propagation) to the lens and/or a beam steerer. Where used, a beam steerer serves to steer a spatially modulated light beam emanating from the spatial light modulator through the lens to create images.

In one or more embodiments, the augmented reality companion device 100 includes a companion device display integration manager 124. The companion device display integration manager 124 can be used to communicate with a companion electronic device. Illustrating by example, when another device transmits event notifications, subtitles, or other contextual information to the augmented reality companion device 100, the companion device display integration manager 124 can deliver that information to the augmented reality image presentation device 121 for presentation to the user as an augmented reality experience via the projector 122.

Figure 2:
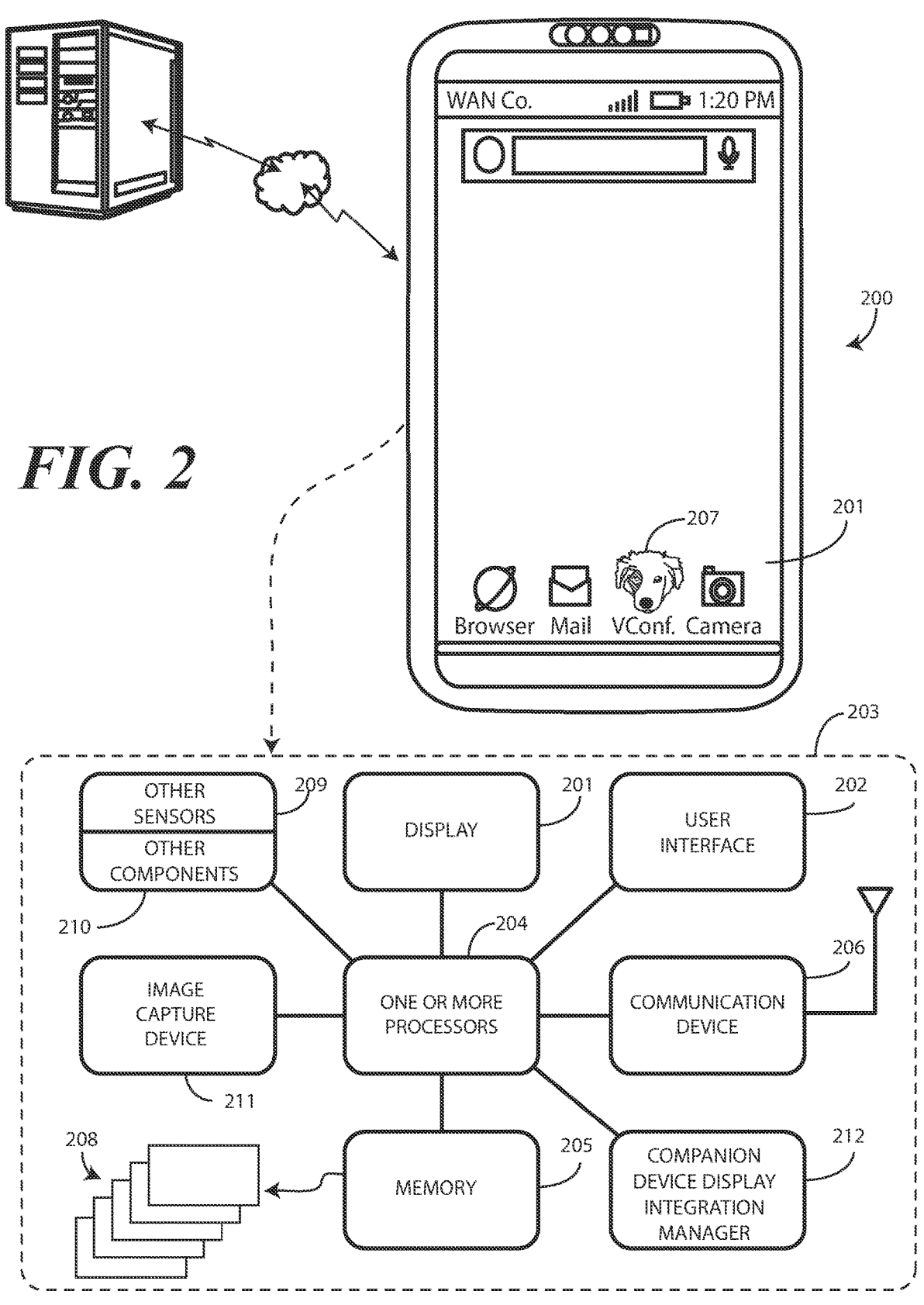
FIG. 2 illustrates one explanatory conferencing system terminal device in accordance with one or more embodiments of the disclosure.

The augmented reality companion device 100 of FIG. 1 can operate as a stand-alone electronic device in one or more embodiments. However, in other embodiments, the augmented reality companion device 100 can operate in tandem with an electronic device, via wireless electronic communication using the wireless communication device 113 or via a wired connection channel 123 to form an augmented reality system. When the electronic device is equipped to engage in a videoconference, it is revered to as a "conferencing system terminal device." Turning now to FIG. 2, illustrated therein is one such conferencing system terminal device 200.

Figure 9:
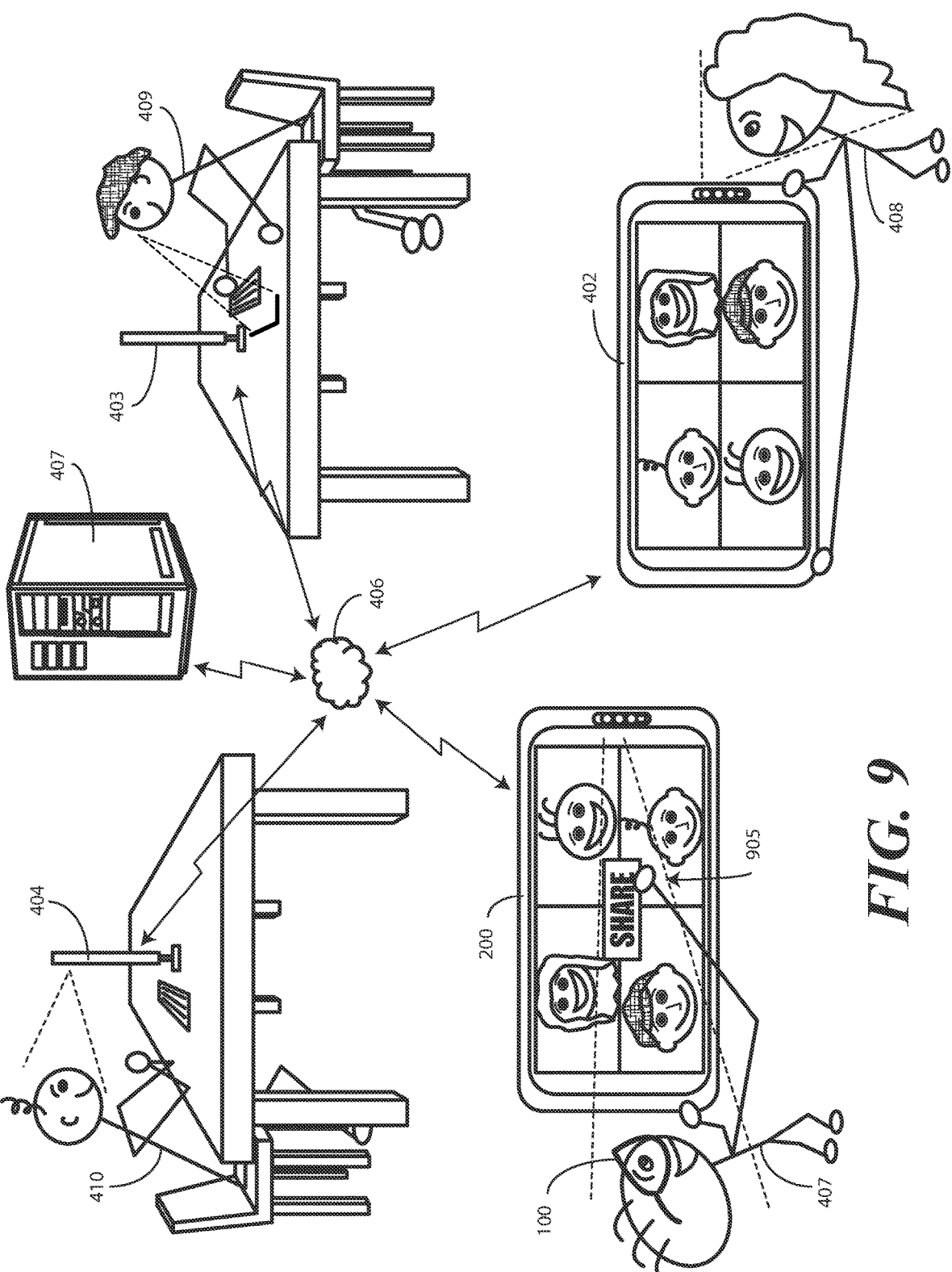
FIG. 9 illustrates one explanatory videoconference system in accordance with one or more embodiments of the disclosure.

The conferencing system terminal device 200 of FIG. 9 is a portable electronic device. For illustrative purposes, the conferencing system terminal device 200 is shown as a smartphone. However, the conferencing system terminal device 200 could be any number of other devices as well, including tablet computers, desktop computers, notebook computers, and so forth. Still other types of conferencing system terminal devices can be configured in accordance with one or more embodiments of the disclosure as will be readily appreciated by those of ordinary skill in the art having the benefit of this disclosure.

This illustrative conferencing system terminal device 200 includes a display 201, which may optionally be touch-sensitive. In one embodiment where the display 201 is touch-sensitive, the display 201 can serve as a primary user interface 202 of the conferencing system terminal device 200. Users can deliver user input to the display 201 of such an embodiment by delivering touch input from a finger, stylus, or other objects disposed proximately with the display 201.

In one embodiment, the display 201 is configured as an active-matrix organic light emitting diode (AMOLED) display. However, it should be noted that other types of displays, including liquid crystal displays, would be obvious to those of ordinary skill in the art having the benefit of this disclosure. Where the conferencing system terminal device 200 is configured with a keyboard and/or mouse, such as when the conferencing system terminal device 200 is configured as a computer, the keyboard and/or mouse can serve as the primary user interface 202.

A block diagram schematic 203 of the conferencing system terminal device 200 is also shown in FIG. 2. The block diagram schematic 203 can be configured as a printed circuit board assembly disposed within the device housing of the conferencing system terminal device 200. Various components can be electrically coupled together by conductors or a bus disposed along one or more printed circuit boards.

In one or more embodiments, the conferencing system terminal device 200 includes one or more processors 204. In one embodiment, the one or more processors 204 can include an application processor and, optionally, one or more auxiliary processors. One or both of the application processor or the auxiliary processor(s) can include one or more processors. One or both of the application processor or the auxiliary processor(s) can be a microprocessor, a group of processing components, one or more ASICs, program-mable logic, or other type of processing device.

The application processor and the auxiliary processor(s) can be operable with the various components of the conferencing system terminal device 200. Each of the application processor and the auxiliary processor(s) can be configured to process and execute executable software code to perform the various functions of the conferencing system terminal device 200. A storage device, such as memory 205, can optionally store the executable software code used by the one or more processors 204 during operation.

The conferencing system terminal device 200 also includes a communication device 206 that can be configured for wired or wireless communication with one or more other devices or networks. The networks can include a wide area network, a local area network, and/or personal area network. The communication device 206 may also utilize wireless technology for communication, such as, but are not limited to, peer-to-peer or ad hoc communications such as HomeRF, Bluetooth and IEEE 802.11, and other forms of wireless communication such as infrared technology. The communication device 206 can include wireless communication circuitry, one of a receiver, a transmitter, or transceiver, and one or more antennas.

In one embodiment, the one or more processors 204 can be responsible for performing the primary functions of the conferencing system terminal device 200. For example, in one embodiment the one or more processors 204 comprise one or more circuits operable with one or more user interface devices, which can include the display 201, to engage in videoconferences by transmitting, receiving, and presenting images, video, content, or other presentation information. The executable software code used by the one or more processors 204, including that associated with a videoconference application 207, can be configured as one or more modules 208 that are operable with the one or more processors 204. Such modules 208 can store instructions, control algorithms, logic steps, and so forth.

In one embodiment, the one or more processors 204 are responsible for running the operating system environment of the conferencing system terminal device 200. The operating system environment can include a kernel and one or more drivers, and an application service layer, and an application layer. The operating system environment can be configured as executable code operating on one or more processors or control circuits of the conferencing system terminal device 200. The application layer can be responsible for executing application service modules. The application service modules may support one or more applications or 'apps,' such as the videoconference application 207. The applications of the application layer can be configured as clients of the application service layer to communicate with services through application program interfaces (APIs), messages, events, or other inter-process communication interfaces. Where auxiliary processors are used, they can be used to execute input/output functions, actuate user feedback devices, and so forth.

In one embodiment, the one or more processors 204 may generate commands or execute control operations based upon user input received at the user interface 202. Moreover, the one or more processors 204 may process the received information alone or in combination with other data, such as the information stored in the memory 205.

The conferencing system terminal device 200 can include one or more sensors 209. The one or more sensors 209 may include a microphone, an earpiece speaker, and/or a second loudspeaker. The one or more other sensors 209 may also include touch actuator selection sensors, proximity sensors, a touch pad sensor, a touch screen sensor, a capacitive touch sensor, and one or more switches. Touch sensors may used to indicate whether any of the user actuation targets present on the display 201, including the audio difficulties user actuation targets described above, are being actuated. The other sensors 209 can also include audio sensors and video sensors (such as a camera).

Other components 210 operable with the one or more processors 204 can include output components such as video outputs, audio outputs, and/or mechanical outputs. Examples of output components include audio outputs such as speaker port, earpiece speaker, or other alarms and/or buzzers and/or a mechanical output component such as vibrating or motion-based mechanisms. Still other components will be obvious to those of ordinary skill in the art having the benefit of this disclosure.

The other components 210 can also include an audio input/processor. The audio input/processor can include hardware, executable code, and speech monitor executable code in one embodiment. The audio input/processor can include, stored in memory 205, basic speech models, trained speech models, or other modules that are used by the audio input/processor to receive and identify voice commands that are received with audio input captured by an audio input/processor, one example of which is a microphone of the one or more sensors 209. In one embodiment, the audio input/processor can include a voice recognition engine. Regardless of the specific implementation utilized in the various embodiments, the audio input/processor can access various speech models to identify speech commands in one or more embodiments.

To capture video during a videoconference, in one or more embodiments the conferencing system terminal device 200 includes an imager 211 or another image capture device. The conferencing system terminal device 200 can optionally include a depth imager as well.

In one embodiment, the imager 211 comprises a two-dimensional imager configured to receive at least one image of a person within an environment of the conferencing system terminal device 200. In one embodiment, the imager 211 comprises a two-dimensional RGB imager. In another embodiment, the imager 211 comprises an infrared imager. Other types of imagers suitable for use as the imager 211 of the conferencing system terminal device 200 will be obvious to those of ordinary skill in the art having the benefit of this disclosure.

Figure 3:
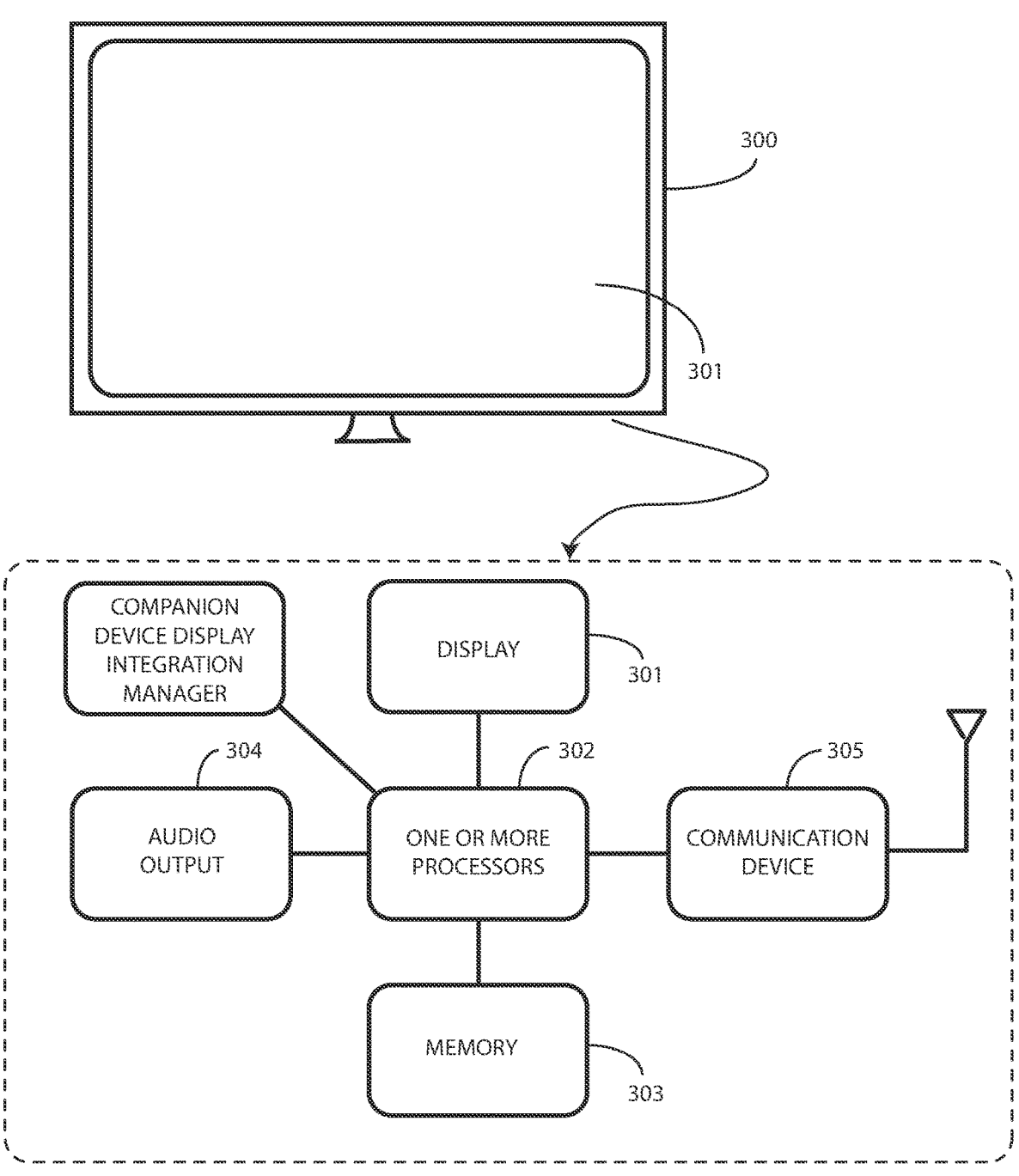
FIG. 3 illustrates one explanatory content presentation companion device in accordance with one or more embodiments of the disclosure.

In one or more embodiments, the conferencing system terminal device 200 includes a companion device display integration manager 212. The companion device display integration manager 212 can be used to communicate with a companion electronic device, one example of which is the augmented reality companion device (100) of FIG. 1. The conferencing system terminal device 200 can operate as a stand-alone electronic device in one or more embodiments. However, in other embodiments, the conferencing system terminal device 200 can operate in tandem with a content presentation companion device and/or augmented reality companion device via wireless electronic communication using the communication device 206. Turning now to FIG. 3, illustrated therein is one such content presentation companion device 300.

In this illustrative embodiment, the content presentation companion device 300 comprises a color video monitor. In other embodiments, the content presentation companion device 300 can take other forms. Illustrating by example, the content presentation companion device 300 can be a television, a computer display, a laptop display, a tablet computer, or a projector projecting content onto a screen. Other examples of content presentation companion devices 300 will be obvious to those of ordinary skill in the art having the benefit of this disclosure. Regardless of configuration, in one or more embodiments the content presentation companion device 300 includes one or more processors 302, a display 301, a memory 303, an audio output 304, and a communication device 305 capable of wired or wireless communication with an electronic device such as the conferencing system terminal device (200) of FIG. 2.

In one or more embodiments, when coupled by a wireless connection to such an conferencing system terminal device (200), the content presentation companion device 300 can function as an auxiliary display for the conferencing system terminal device (200). The conferencing system terminal device (200) can receive content from a terrestrial broadcast network, cable television network, videoconference server, Internet streaming service, or combinations thereof, and redirect this content to the content presentation companion device 300 (using its companion device display integration manager (212)) since its display 301 is larger than the display (201) of the conferencing system terminal device (200). In one or more embodiments, content flows from the conferencing system terminal device (200) to the content presentation companion device 300 through the communication device 305.

It is to be understood that in FIGS. 1-3 above, the elements illustrated are provided for illustrative purposes only in accordance with embodiments of the disclosure. None is intended to be a complete schematic diagram of the various components required. Therefore, other augmented reality companion devices, conferencing system terminal devices, and content presentation companion devices configured in accordance with embodiments of the disclosure may include various other components obvious to those of ordinary skill in the art having the benefit of this disclosure, but not shown in FIGS. 1-3, or may include a combination of two or more components or a division of a particular component into two or more separate components, and still be within the scope of the present disclosure.

Figure 4:
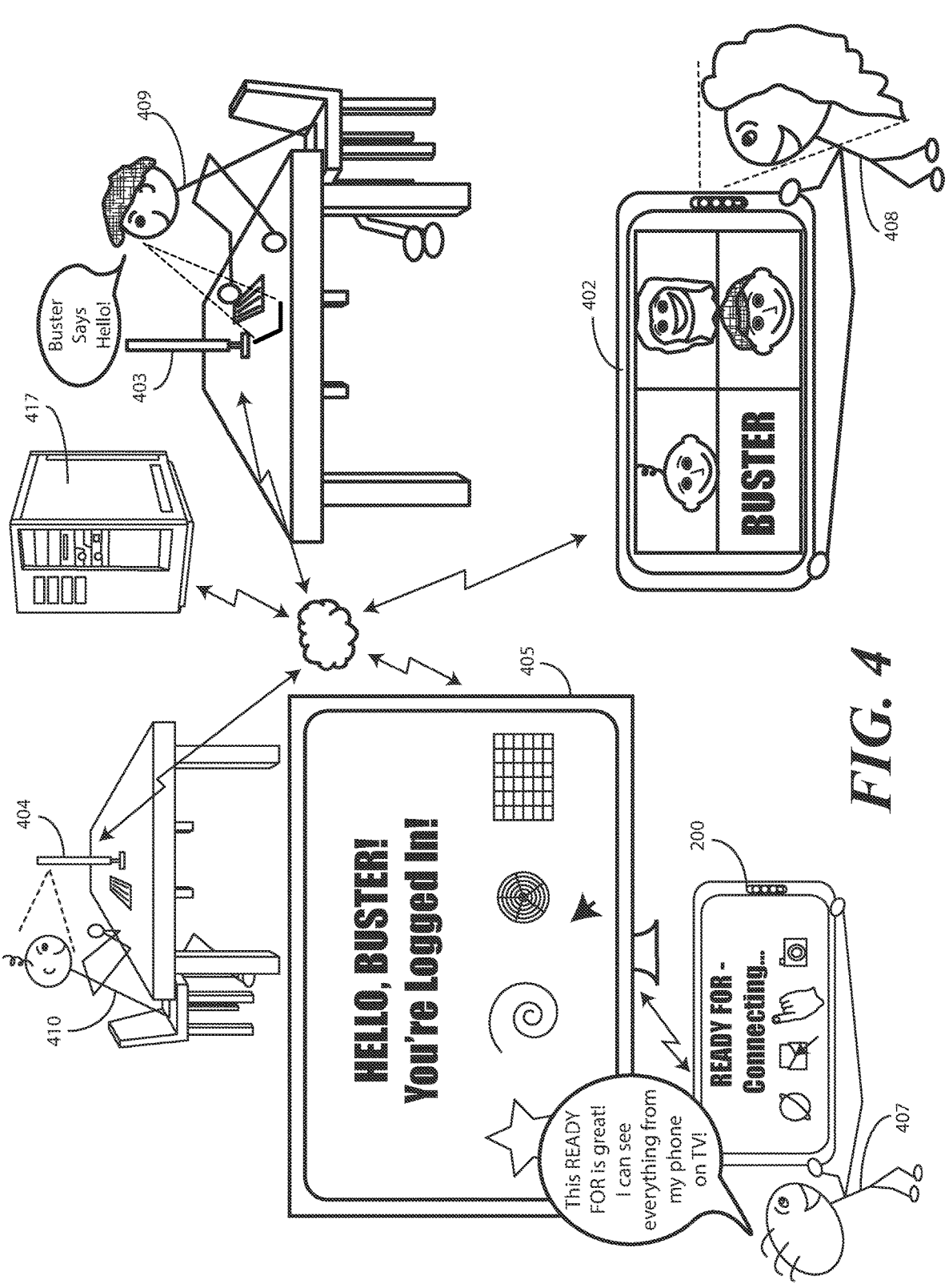
FIG. 4 illustrates one explanatory videoconference system in accordance with one or more embodiments of the disclosure.

Turning now to FIG. 4, illustrated therein is one explanatory videoconference system in accordance with one or more embodiments of the disclosure. As shown, multiple participants 407,408,409,410 each employ their own respective conferencing system terminal device 200,402,403,404 to engage with the other participants via the videoconference. In this illustrative embodiment, conferencing system terminal devices 200,402 are shown as smartphones, while conferencing system terminal devices 403,404 are shown as desktop computers. Additionally, participant 407 is using a content presentation companion device 405 as an auxiliary display for his conferencing system terminal device 200. While this system provides one explanatory configuration of electronic devices engaged in a videoconference, conferencing system terminal devices suitable for use in the videoconference system can take other forms as well. For instance, tablet computers, notebook computers, audiovisual devices, mobile phones, smart watches, or other devices can be used by participants to engage in the videoconference as well. Other examples of conferencing system terminal devices will be obvious to those of ordinary skill in the art having the benefit of this disclosure.

As shown in FIG. 4, each conferencing system terminal device 200,402,403,404 is engaged in wired or wireless communication with each other across a network 406, one example of which is the Internet via the World Wide Web. It should be noted that the network 406 could be a public, private, local area, wide area, or other type of network across which wired or wireless electronic communications can be exchanged.

In this illustrative embodiment, each conferencing system terminal device 200,402,403,404 is also in communication with a video conferencing system server complex 417 across the network 406. In one or more embodiments video conferencing system server complex 417 includes components such as a web server, a database server, an audio server, and optionally a video server (the video server may be omitted for audio only conferencing systems) that are operable to facilitate videoconferences between the various conferencing system terminal devices 200,402,403,404 of the videoconference system.

These components of the video conferencing system server complex 417 can be combined on the same server. Alternatively, these components can be distributed on any number of servers to increase load handling capacity beyond that of a single server, and so forth. Other configurations for the video conferencing system server complex 417 will be obvious to those of ordinary skill in the art having the benefit of this disclosure.

In one or more embodiments, the video conferencing system server complex 417 performs functions such as maintaining a schedule of videoconferences, maintaining lists of participants, as well as allowing each participant's conferencing system terminal device to engage with the videoconference, and so forth. In one or more embodiments, the video conferencing system server complex 417 also facilitates the transmission of audio and video content during the occurrence of the videoconference.

In one or more embodiments, the video conferencing system server complex 417 functions as an intermediary device to facilitate sharing of audio and/or video content and/or data between the various conferencing system terminal devices 200,402,403,404. For example, as can be seen on the displays of conferencing system terminal device 402, in this example participant 408 can see each other participant engaged in the videoconference.

In the illustrative example of FIG. 4, as can be seen on the display of conferencing system terminal device 402, participants 408,409,410 are engaged in the videoconference. Participant 407 is in the process of pairing the content presentation companion device 405 with his conferencing system terminal device 200. Once paired, participant 407 will also join the videoconference.

In FIG. 4, the conferencing system terminal device 200 and the content presentation companion device 405 operate in tandem as a system, with the conferencing system terminal device 200 providing the processing power while the content presentation companion device 405 serves as an auxiliary display device for the conferencing system terminal device 200.

As shown in FIG. 4, the conferencing system terminal device 200 is electronically in communication with the content presentation companion device 405. When the conferencing system terminal device 200 is electronically in communication with the content presentation companion device 405, this allows the conferencing system terminal device 200 to use the larger display of the content presentation companion device 405 to present content. Illustrating by example, in one or more embodiments the conferencing system terminal device 200 can operate in a "content redirection" mode by presenting content such as movies, videos, videoconferences. images, and even a traditional computer user interface, on the display of the content presentation companion device 405.

Embodiments of the disclosure contemplate that with the advanced computing power available in smartphones and other electronic devices, users often consume movies, videos, television shows, and other content, including videoconference content, using these devices. By establishing an electronic communication channel between the conferencing system terminal device 200 and the content presentation companion device 405, the processing power of the conferencing system terminal device 200 can be leveraged to present content on the display of the content presentation companion device 405. This allows videoconference participant 407 to use the display of the content presentation companion device 405 to engage in the videoconference of FIG. 4.

Since the participants 408,409,410 are all engaged in a videoconference, each can see conference content in the form of a combined video feed from each other participant 408,409,410 presented on the display of each conferencing system terminal device 402,403,404, as well as a video feed of themselves. Under ordinary conditions, each participant 408,409,410 can hear an audio feed from each other participant 408,409,410 as well.

In this illustrative embodiment, participant 409 is acting as a presenter, and is speaking, noting that a friend, Buster, "says hello." Participant 409 is stalling for participant 407, who is late in joining the videoconference. The presenter's conferencing system terminal device 403 receives this audio and captures video of the presenter and transmits the same to the other conferencing system terminal devices 402,403 via the video conferencing system server complex 417. While participant 409 is the presenter at the moment, it is to be understood that the presenter role can be changed throughout the videoconference as well, with each other participant 408,410 taking the role of presenter at other times as situations warrant. When participant 407 finally joins the videoconference, he can serve as presenter as well.

Figure 5:
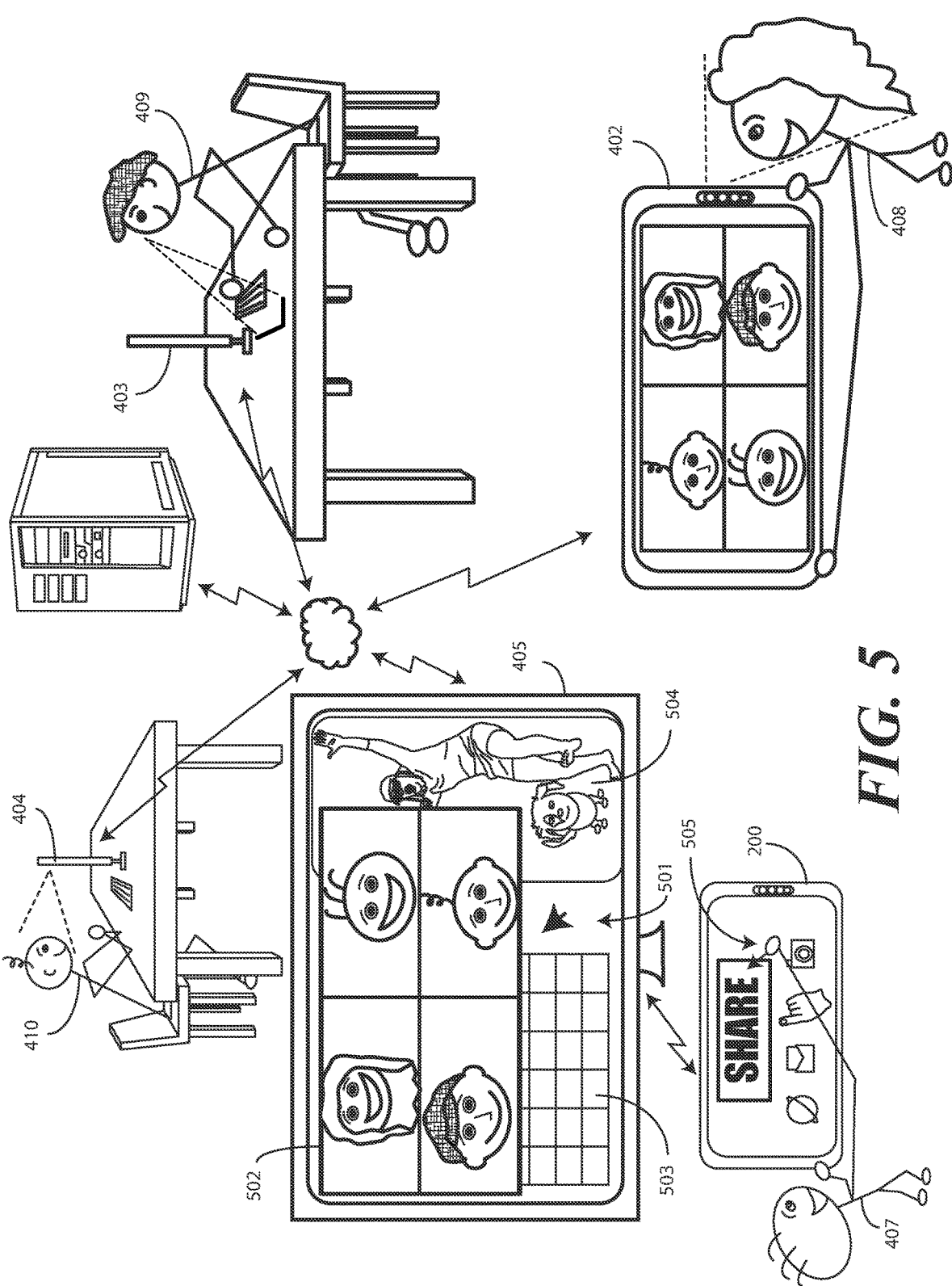
FIG. 5 illustrates one explanatory videoconference system in accordance with one or more embodiments of the disclosure.

Turning now to FIG. 5, participant 407 has fully engaged the videoconference. Participant 407 also wants to become the presenter. As shown on the display of the content presentation companion device 405, participant 407 is multitasking, with many different windows open on the desktop 501 being displayed on the content presentation companion device 405. (Here the content presentation companion device 405 is functioning as the primary display for the system defined by the conferencing system terminal device 200 and the content presentation companion device 405, with the display of the conferencing system terminal device 200 serving as an auxiliary display. Accordingly, since the desktop 501 is being presented on the content presentation companion device 405, the conferencing system terminal device 200 effectively becomes a content presentation companion device for the content presentation companion device 405.) In this illustration, the desktop includes a shared space 502 depicting content associated with the videoconference, a spreadsheet 503 that participant 407 wishes to share with the other participants 408,409,410 of the videoconference and a hilarious video 504 that participant 407 is watching on the side, despite the fact that he should instead be fully engaged in the videoconference.

The one or more processors (204) of conferencing system terminal device 200 detect, during the videoconference that the communication device (206) of the conferencing system terminal device 200 is electronically in communication with both the content presentation companion device 405 and one or more remote electronic devices engaged in the videoconference, here conferencing system terminal devices 402,403, 404. Since participant 407 desires to share the spreadsheet 503 with the other conferencing system terminal devices 402,403,404, he delivers user input 505 to the user interface of conferencing system terminal device 200 requesting for the spreadsheet to be shared from the conferencing system terminal device 200 with the other conferencing system terminal devices 402,403,404 engaged in the videoconference.

To identify that the spreadsheet 503 should be shared, participant 407 believes he has selected the spreadsheet 503 as content to be shared. However, in this example, he has inadvertently selected the hilarious video 504 instead. If he were to share the hilarious video 504 with the other participants 408,409,410, either by sharing it as selected content or by sharing the desktop 501, it would be embarrassing as the other participants 408,409,410 would instantly know that participant 407 was not fully engaged in the videoconference.

Figure 6:
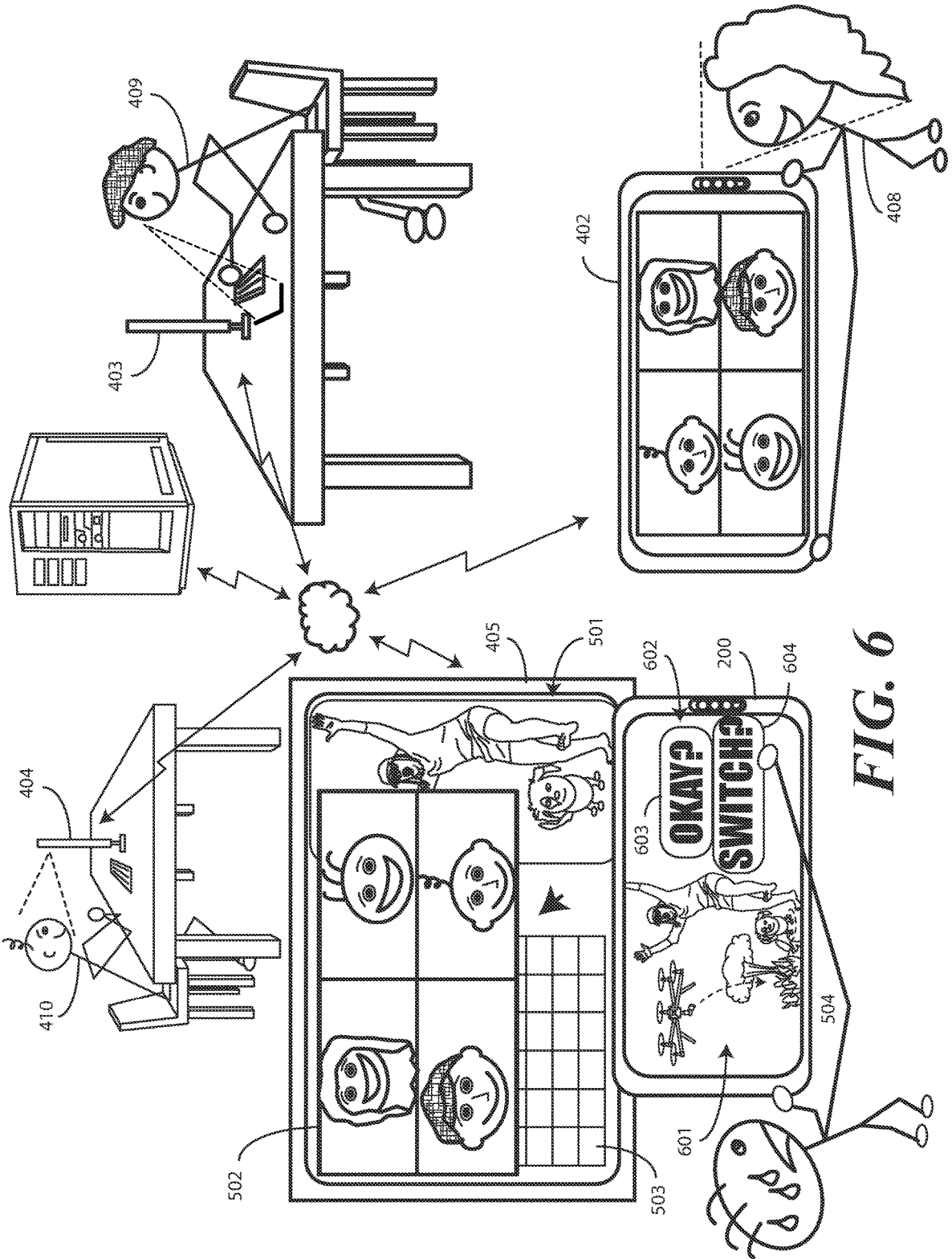
FIG. 6 illustrates one explanatory videoconference system in accordance with one or more embodiments of the disclosure.

Advantageously, embodiments of the disclosure provide a solution to this problem. Turning now to FIG. 6, in one or more embodiments, prior to causing the communication device (206) of the conferencing system terminal device 200 to share the spreadsheet 503 with the other conferencing system terminal devices 402,403,404 engaged in the videoconference, the one or more processors (204) of the conferencing system terminal device 200 present a content verification presentation 601 on the display of the conferencing system terminal device 200. In this illustrative embodiment, the content verification presentation 601 presents the content selected for sharing in FIG. 5, which turns out to be the hilarious video 504 and not the spreadsheet 503.

Shocked and dismayed at the inadvertent and erroneous selection of content to be shared, participant 407 can privately preview what would be shared and can detect that the hilarious video 504 is about to be shared. The same preview can be made if, for example, participant 407 had elected to share the desktop 501 as a whole rather than selecting a single application. The content verification presentation 601 of FIG. 6 would have shown that portions of the hilarious video 504 were exposed and visible on the desktop 501. Thus, by viewing the content verification presentation 601 on a content presentation companion device of the primary display being used for the shared space 502 of the videoconference, the participant 407 can preview content to ensure that no personal, private, or other content that should not be shared prior to any sharing with the other conferencing system terminal devices 402,403,404 occurring.

What's more, if participant 407 had been sharing content prior to attempting to sharing the spreadsheet 503, with that content appearing within the shared space 502 of the videoconference, the presentation of the content verification presentation 601 on a content presentation companion device of the primary display allows the participant 407 to ensure that the proper content is to be shared next without obscuration or restriction of any content currently being shared in the shared space 502 with the other videoconference participants 408,409,410. The system does this by keeping the "to be shared" content, which is the spreadsheet 503 in this example, private and visible only to the sharing participant 407 by presenting it on a content presentation companion device of a primary content presentation device, which is the display of the conferencing system terminal device 200 in this example.

As shown in FIG. 6, in one or more embodiments the one or more processors (204) of the conferencing system terminal device 200 preclude the communication device (206) from sharing the "to be shared content," which was intended to be the spreadsheet 503 but is instead the hilarious video 504 from being shared with the other conferencing system terminal devices 402,403,404 until a content share confirmation is received at the user interface of the electronic device presenting the content verification presentation 601. In this illustration, the content verification presentation 601 comprises a prompt 602 allowing for a content share confirmation allowing the hilarious video 504 to be shared at a first user actuation target 603. The content verification presentation 601 also presents a content selector 604 allowing the sharing participant 407 to select alternate content for sharing. Since participant 407 does not want the hilarious video to be shared with the other conferencing system terminal devices 402,403,404, he delivers user input to the content selector 604, thereby allowing him to select other content.

Figure 7:
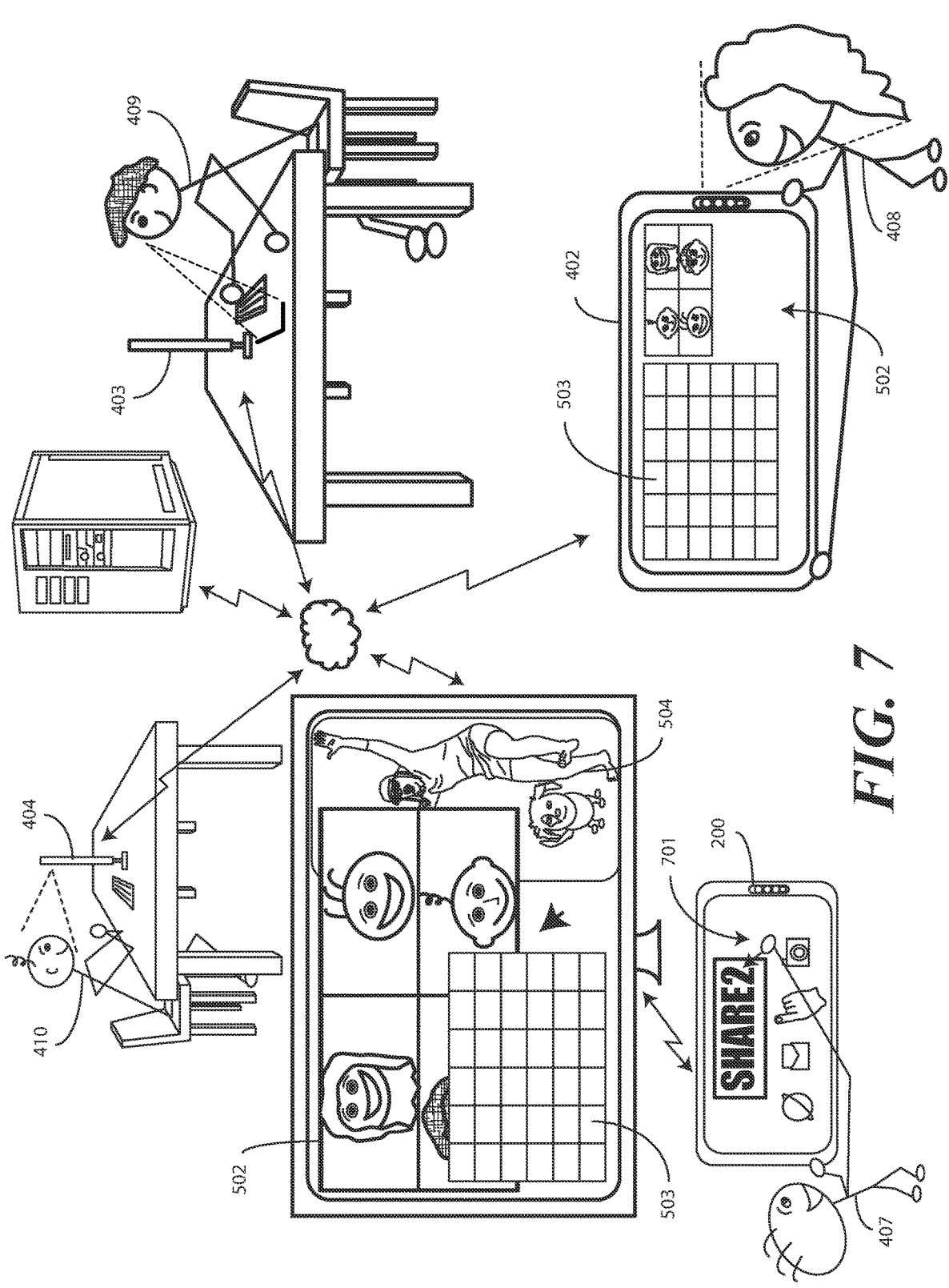
FIG. 7 illustrates one explanatory videoconference system in accordance with one or more embodiments of the disclosure.

Turning now to FIG. 7, the participant 407 then selects the spreadsheet 503 as the content to be shared, delivering user input 701 to the user interface of the conferencing system terminal device 200 requesting for the spreadsheet 503 to be shared with the other conferencing system terminal devices 402,403,404. The process would then repeat, as shown above in FIG. 6. However, instead of the content verification presentation (601) presenting the hilarious video 504, it would instead present the spreadsheet 503. Rather than selecting the content selector (604), since participant 407 does intend to share the spreadsheet 503, the participant would deliver a content share confirmation by touching the first user actuation target (603) of the prompt. The user interface of the conferencing system terminal device 200 would then receive this content share confirmation in response to the content verification presentation 601. The one or more processors (204) would then cause the communication device (206) to share the spreadsheet 503 with the other conferencing system terminal devices 402,403,404 during the videoconference in response to receiving the content share confirmation.

As shown in FIG. 7, this results in the spreadsheet 503 being moved to the shared space 502 of the videoconference. As shown on the display of conferencing system terminal device 402, this means the spreadsheet 503 is successfully being shown to other participants 408,409,410 in the shared space 502 of the videoconference.

In the example provided by FIGS. 5-7, only the selected content, e.g., the hilarious video 504 of FIG. 6 or the spreadsheet 503 when FIG. 6 is repeated, is presented in the content verification presentation 601. However, embodiments of the disclosure are not so limited. In other embodiments, a plurality of content offerings could be included in the content verification presentation 601.

Illustrating by example, repeating FIGS. 5-7, if participant 407 had elected to share the desktop 501, the content verification presentation 601 may include a presentation of the desktop 501 that includes each of the shared space 502 of the videoconference, the spreadsheet 503, and the hilarious video. Said differently, in this scenario the content verification presentation 601 can include a plurality of content offerings available to be shared with the one or more conferencing system terminal devices 402,403,404 engaged in the videoconference. While a spreadsheet 503 and a hilarious video 504 are examples of such content offerings, embodiments of the disclosure are not so limited. In other embodiments, the plurality of content offerings comprises one or more of an application actively operating on the one or more processors (204) of the conferencing system terminal device 200, a tab of a web browser, an image of the desktop or another display of another electronic device operating as a system with the conferencing system terminal device 200, a file manager or an application window. Other examples of content offerings that can be shared during a videoconference will be obvious to those of ordinary skill in the art having the benefit of this disclosure.

Where such a plurality of content offerings is presented, a user can make a selection of the content to be shared from the plurality of content offerings presented in the content presentation companion device. Using the example of FIGS. 5-7, if participant 407 had shared the desktop 501 initially, in one or more embodiments the content verification presentation 601 would include a depiction of the desktop 501. By touching one of the open windows, e.g., the spreadsheet 503 or the hilarious video 504, participant 407 could select the content to be shared directly from the content verification presentation 601 in one or more embodiments. Accordingly, the content share confirmation delivered at FIG. 6 by touching the user actuation target 603 would comprise a selection of the content from the plurality of content offerings shown in the content verification presentation 601.

What's more, in the example of FIGS. 5-7, the hilarious video 504 is at least partially obscured on the desktop 501 when the user input 505 requesting that content be shared is received. This may have been what initially led to the participant 407 inadvertently selecting the hilarious video 504 instead of the spreadsheet 503. However, by presenting the content verification presentation 601 as shown in FIG. 6, the participant 407 can quickly and easily be alerted to this mistake before any sharing occurs, thereby avoiding embarrassment. The conferencing system terminal device 200 does this by allowing "to be shared" content to remain private and visible only to the participant 407 requesting the share until the content share confirmation is received by touching the user actuation target 603. Once the content share confirmation is received, the shared content is moved to the shared space 502 and made visible to the remainder of the participants 408,409,410, as shown in FIG. 7

Accordingly, as shown in FIGS. 5-7, a conferencing system terminal device 200 includes a communication device (206) in communication with both one or more remote electronic devices, shown in FIGS. 5-7 as other conferencing system terminal devices 402,403,404 during a videoconference. In FIGS. 5-7, since the content presentation companion device 405 is operating as a primary display for the conferencing system terminal device 200, the display of the conferencing system terminal device 200 performs the function of serving as a content presentation companion device for content presentation companion device 405.

As shown at FIG. 5, a user interface receives user input 505 requesting the communication device (206) share content from the conferencing system terminal device 200 with the one or more remote electronic devices. One or more processors operable (204) with the communication device (206) and the user interface then prevent the communication device (206) from sharing the content with the one or more remote electronic devices until a content share confirmation, here actuation of user actuation target 603, is received from the content presentation companion device in response to the one or more processors (204) causing the communication device (206) to present a content verification presentation 601 on a display of the content presentation companion device.

The content verification presentation 601 can include a presentation of the content as shown in FIG. 6. Alternatively, it can include a plurality of content offerings from which content to be shared is selected. Illustrating by example, if the participant 407 elected to share the desktop 501 in FIG. 5, the content verification presentation 601 presented at FIG.

6 may include both the spreadsheet 503 and the hilarious video 504, from which the participant 407 could select which content offering to share. In one or more embodiments, the plurality of content offerings included with the content verification presentation 601 includes all applications operating on the one or more (204) other than the shared space 502 of the videoconference application (207) engaged in the videoconference.

According, FIGS. 5-7 illustrate a solution to problems arising when content sharing operations are initiated during a videoconference. In one or more embodiments, one or more processors (204) detect, during a videoconference, a communication device (206) electronically in communication with both a content presentation companion device 405 having a display and one or more remote electronic devices engaged in the videoconference. When a participant 407 in the videoconference desires to share content with others, the one or more processors (204) receive, with a user interface, user input 505 requesting for the content to be shared from the conferencing system terminal device 200 with the one or more remote electronic devices engaged in the videoconference.

However, in contrast to prior art systems that immediately make the content available for viewing by others, prior to causing the communication device (206) to share the content with the one or more remote electronic devices during the videoconference, the one or more processors (204) present, on the display of the content presentation companion device (here, the display of conferencing system terminal device 200 since it is acting as an auxiliary display for content presentation companion device 405), a content verification presentation 601. To confirm the content included with the content verification presentation 601 is indeed content that a participant 407 desires to share, the one or more processors (204) preclude any sharing until a content share confirmation is received by actuating user actuation target 603 in this example, by another user interface of the content presentation companion device 405, in response to the content verification presentation 601. In one or more embodiments, only after the content share confirmation is received do the one or more processors (204) share the content with the other participants of the videoconference.

In some applications, the operations of FIGS. 5-7 are enabled only after initial content has been shared. Illustrating by example, if participant 407 was initially sharing an image, and then elected to share the spreadsheet 503, in one or more embodiments the preview and/or selection operations performed by the content presentation companion device would be enabled. Thus, in one or more embodiments, after detecting that the participant 407 is connected to a device (content presentation companion device 405) which is accompanied by a connected display device (provided by conferencing system terminal device 200 in this example, one or more processors (204) of the conferencing system terminal device 200 detect that the participant 407 is engaged in a videoconference with content (a picture, for example) being shared by the participant 407 within a shared space 502 of a videoconference that is actively viewable by at least one other participant 408,409,410 of the videoconference.

By receiving user input 505 indicating that the participant would like to share additional content, e.g., the spreadsheet 503, other than what is being currently shared, the operations of FIGS. 6-7 are enabled. In one or more embodiments, a content verification presentation 601 is presented that moves all the active windows and file explorer option to the connected device viewing space (here the display of conferencing system terminal device 200), thereby allowing the participant 407 to select which content to share. In one or more embodiments, the content verification presentation 601 then privately previews the selected content on the auxiliary display as shown in FIG. 6. This also prevents any obscuration or restriction of viewable objects being presented in the shared space 502 of the videoconference.

In one or more embodiments, once a content share confirmation is received via actuation of user actuation target 603, the one or more processors (204) of the conferencing system terminal device 200 move the selected content to the shared space 502 of the videoconference, thereby allowing the other participants 408,409,410 to view the shared content. In one or more embodiments, the content verification presentation 601 includes an application or content selector 604 operable to launch a selected application to render the content. Where this is the case, one or more processors (204) of the conferencing system terminal device 200 actuate a selected application in response to receiving the content share confirmation. Thus, if the spreadsheet 503 had not been active, in one or more embodiments the participant 407 could use the content selector 604 to launch the spreadsheet application to share the spreadsheet 503 in the shared space 502 of the videoconference. In the illustrative embodiment of FIGS. 5-7, the spreadsheet 503 was operational but was merely partially obscured by the shared space 502 of the videoconference when the user input 505 requesting the communication device (206) share the content was received.

Figure 8:
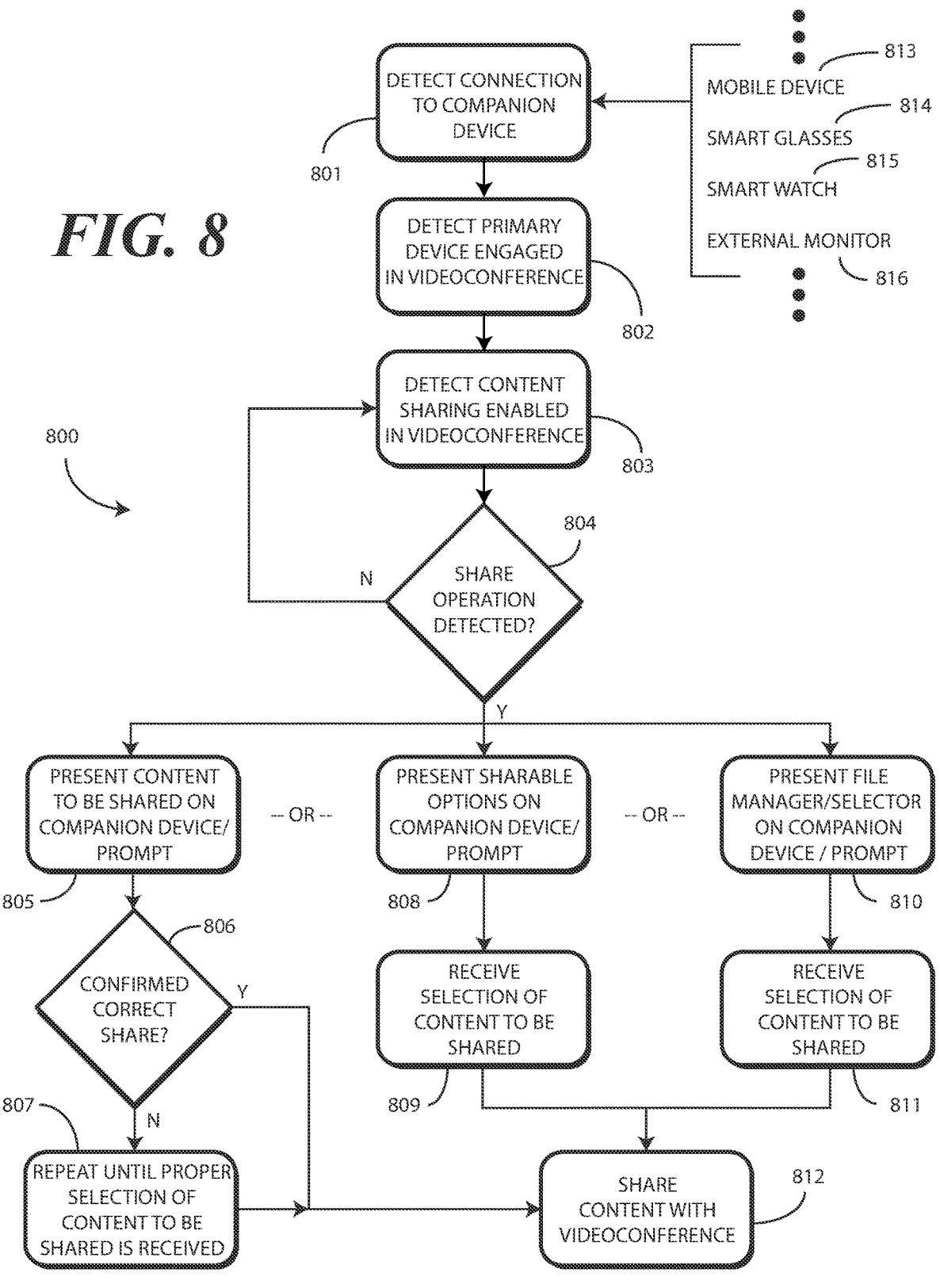
FIG. 8 illustrates one explanatory method in accordance with one or more embodiments of the disclosure.

Turning now to FIG. 8, illustrated therein is one explanatory method 800 for performing both the operations shown in FIGS. 5-7, as well as additional operations in accordance with embodiments of the disclosure. Beginning at step 801, one or more processors of a conferencing system terminal device detect, during a videoconference, that a communication device of the conferencing system terminal device is electronically in communication with both a content presentation companion device having a display and one or more remote electronic devices engaged in the video conference.

The content presentation companion device could take any of a number of forms, including that of a portable electronic communication device 813, a pair of augmented reality or smart glasses 814, a smartwatch 815, or an external monitor 816. In the system shown in FIGS. 5-7, which included a conferencing system terminal device (200) engaged in a videoconference with one or more remote electronic devices and a content presentation companion device (405) in communication with the conferencing system terminal device (200) during the videoconference, the conferencing system terminal device (200) served as the "companion" device since the content presentation companion device (405) was acting as the primary display for participant (407). Other examples of content presentation companion devices will be obvious to those of ordinary skill in the art having the benefit of this disclosure.

At step 802, the one or more processors of the conferencing system terminal device detect that the conferencing system terminal device is engaged in a videoconference. At step 803, the one or more processors detect that content sharing capabilities have been enabled at the conferencing system terminal device. Step 803 can optionally include detecting that a first content offering is actively being shared as well.

Decision 804 determines whether the one or more processors of the conferencing system terminal device receive user input requesting content (or an additional content offering if a first content offering is detected being shared at step 803) be shared from the conferencing system terminal device to the one or more remote electronic devices. Where such input is received, the method 800 can proceed in a variety of ways.

If a selection of content was made in conjunction with, or prior to, the user input requesting the content (or an additional content offering if a first content offering is detected being shared at step 803) be shared with the one or more remote electronic devices, in one or more embodiments the method 800 moves to step 805 where the one or more processors of the conferencing system terminal device present a preview of the selected content (or the selected additional content offering if a first content offering is detected being shared at step 803) on the display of the content presentation companion device for review. In one or more embodiments, step 805 comprises also preventing the sharing of the selected content (or the selected additional content offering if a first content offering is detected being shared at step 803) until a content share confirmation is received from the content presentation companion device.

Decision 806 then determines if the content share confirmation is received. Where it is not, step 807 can comprise presenting a different content offering from the actively available content offerings for consideration. Thus, if the situation depicted above with reference to FIGS. 5-7 arose where a participant (407) meant to select a spreadsheet (503) but instead selected the hilarious video (504), after failing to present the proper content on the display of the content presentation companion device when presenting the hilarious video (504), the one or more processors may choose another actively open content offering, i.e., the spreadsheet (503) to repeat the process. In an alternate embodiment, a content selector is presented at step 807 allowing the participant to manually select the proper content. Thus, in one or more embodiments the one or more processors present, at step 807, an alternate content selector on the display of the content presentation companion device and preclude presentation of the content when the alternate selector is actuated. Thereafter, once the participant has selected the new content offering, step 807 can comprise the content verification presentation presenting the newly selected content on the display of the content presentation companion device in response to the actuation of the alternate content selector and the corresponding new content selection. Of course, a combination of both approaches can be used with the content verification presentation presented at step 805 presenting both a content offering and a content selector, as illustrated above with reference to FIG. 6.

In one or more embodiments, since any preview of a content selection and/or alternate content selector are presented on a display of a content presentation companion device, rather than the primary display of the content presentation companion device/conferencing system terminal device system, both steps 805 and 807 leave the videoconference unobscured while the content is being reviewed. Once the content share confirmation is received, the one or more processors can share the content in the shared space of the videoconference with the other remote electronic devices at step 812.

Alternatively, if the content has not been selected in conjunction with—or before—the user input requesting the share as detected by decision 804, the method 800 can move to step 808. In one or more embodiments, step 808 comprises presenting a content verification presentation comprising a plurality of content offerings available to be shared with the one or more remote electronic devices engaged in the videoconference. In one or more embodiments, this includes moving all actively operable applications and windows into the content verification presentation so that a participant can select which one or ones to share. For example, the plurality of content offerings can comprise one or more of an application actively operating on the one or more processors, a tab of a web browser, an image or desktop view from a display of the conferencing system terminal device while engaged in the videoconference, a file manager, an application window, or another content offering. Still other examples of potential selections for inclusion with the content verification presentation will be obvious to those of ordinary skill in the art having the benefit of this disclosure.

Step 809 then comprises receiving a selection of the content to be shared from the plurality of content offerings. While this selection can come at the conferencing system terminal device, in one or more embodiments the selection is made privately at the display of the content presentation companion device. In one or more embodiments, the selection at step 809 occurs in conjunction with the receipt of a content share confirmation. In other embodiments, step 809 comprises first receiving the selection of the content offering and then receiving the content share confirmation. Once the content share confirmation is received, the one or more processors can share the content in the shared space of the videoconference with the other remote electronic devices at step 812.

In still other embodiments where the content has not been selected in conjunction with—or before—the user input requesting the share as detected by decision 804, the method 800 can move to step 810. In one or more embodiments, step 810 comprises presenting a content verification presentation that includes an application selector operable to launch a selected application to render the content to be shared.

Step 811 then comprises receiving a selection of the content to be shared from the plurality of content offerings. In one or more embodiments, the selection at step 809 occurs in conjunction with the receipt of a content share confirmation. In other embodiments, step 809 comprises first receiving the selection of the content offering and then receiving the content share confirmation. In one or more embodiments, the one or more processors of the conferencing system terminal device actuate the selected application in response to receiving the content share confirmation. Once the content share confirmation is received, the one or more processors can share the content in the shared space of the videoconference with the other remote electronic devices at step 812.

Embodiments of the disclosure work equally as well when the content presentation companion device is an augmented reality companion device. Illustrating by example, if the content presentation companion device comprises augmented reality glasses, in response to receiving, with a user interface, user input requesting for content to be shared from the conferencing system terminal device with the one or more remote electronic devices engaged in the videoconference and prior to causing the communication device to share the content with the one or more remote electronic devices during the videoconference, the one or more processors can presenting, in a field of view of the augmented reality glasses, the content verification presentation. The one or more processors can then receive, with a user interface of the conferencing system terminal device or the augmented reality glasses, a content share confirmation in response to the content verification presentation.

In one or more embodiments, when the content presentation companion device is configured as an augmented reality companion device, images of the content verification presentation are presented within a field of view of the augmented reality glasses in a carousel presentation around the conferencing system terminal device. In one or more embodiments, the participant can select the shared content via a gesture, gaze, mouse click, or other user input. The one or more processors can then cause a communication device of the conferencing system terminal device to share the selected content with one or more remote electronic devices during the videoconference in response to receiving the content share confirmation. Turning now to FIG. 9, illustrated therein is one such system.

As shown in FIG. 9, multiple participants 407,408,409, 410 again each employ their own respective conferencing system terminal device 200,402,403,404 to engage with the other participants in videoconference. In this illustrative embodiment, participant 407 is using an augmented reality companion device 100 configured as a pair of augmented reality glasses. The augmented reality companion device 100 provides a field of view that functions as an auxiliary display for his conferencing system terminal device 200.

As shown in FIG. 9, each conferencing system terminal device 200,402,403,404 is engaged in wired or wireless communication with each other across a network 406. In this illustrative embodiment, each conferencing system terminal device 200,402,403,404 is also in communication with a video conferencing system server complex 417, which facilitates the videoconference. In one or more embodiments, the video conferencing system server complex 417 functions as an intermediary device to facilitate sharing of audio and/or video content and/or data between the various conferencing system terminal devices 200,402,403,404.

In the illustrative example of FIG. 9, participants 407, 408,409,410 are each engaged in the videoconference. The conferencing system terminal device 200 belonging to participant 407 is electronically in communication with the augmented reality companion device 100. When the conferencing system terminal device 200 is electronically in communication with the augmented reality companion device 100, this allows the conferencing system terminal device 200 to cause the presentation of augmented reality imagery within a field of view of the augmented reality companion device 100. Illustrating by example, in one or more embodiments the conferencing system terminal device 200 can operate in a "content redirection" mode by presenting content such as movies, videos, videoconferences. images, and even a traditional computer user interface, within the field of view of the augmented reality companion device 100.

Since the participants 407,408,409,410 are all engaged in a videoconference, each can see conference content in the form of a combined video feed from each other participant 407,408,409,410 presented on the display of each conferencing system terminal device 200,402,403,404, as well as a video feed of themselves. Under ordinary conditions, each participant 407,408,409,410 can hear an audio feed from each other participant 407,408,409,410 as well.

As shown in FIG. 9, participant 407 also wants to become the presenter. The one or more processors (204) of conferencing system terminal device 200 detect, during the videoconference that the communication device (206) of the conferencing system terminal device 200 is electronically in communication with both the augmented reality companion device 100 and one or more remote electronic devices engaged in the videoconference, here conferencing system terminal devices 402,403,404. Since participant 407 desires to share content with the other conferencing system terminal devices 402,403,404, he delivers user input 905 to the user interface of conferencing system terminal device 200 requesting for content to be shared from the conferencing system terminal device 200 with the other conferencing system terminal devices 402,403,404 engaged in the video-conference.

Figure 10:
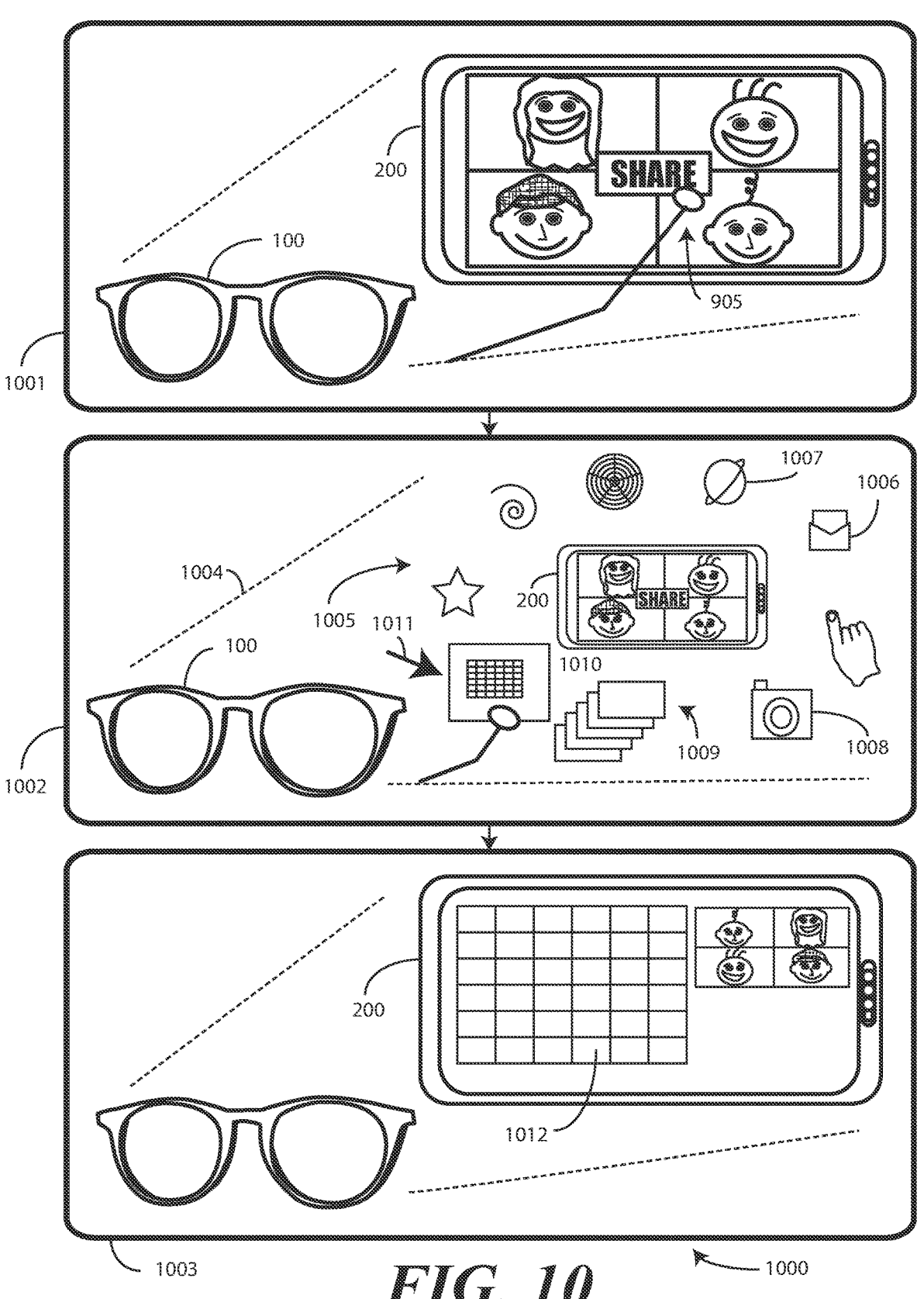
FIG. 10 illustrates one or more method steps in accordance with one or more embodiments of the disclosure.
Figure 11:
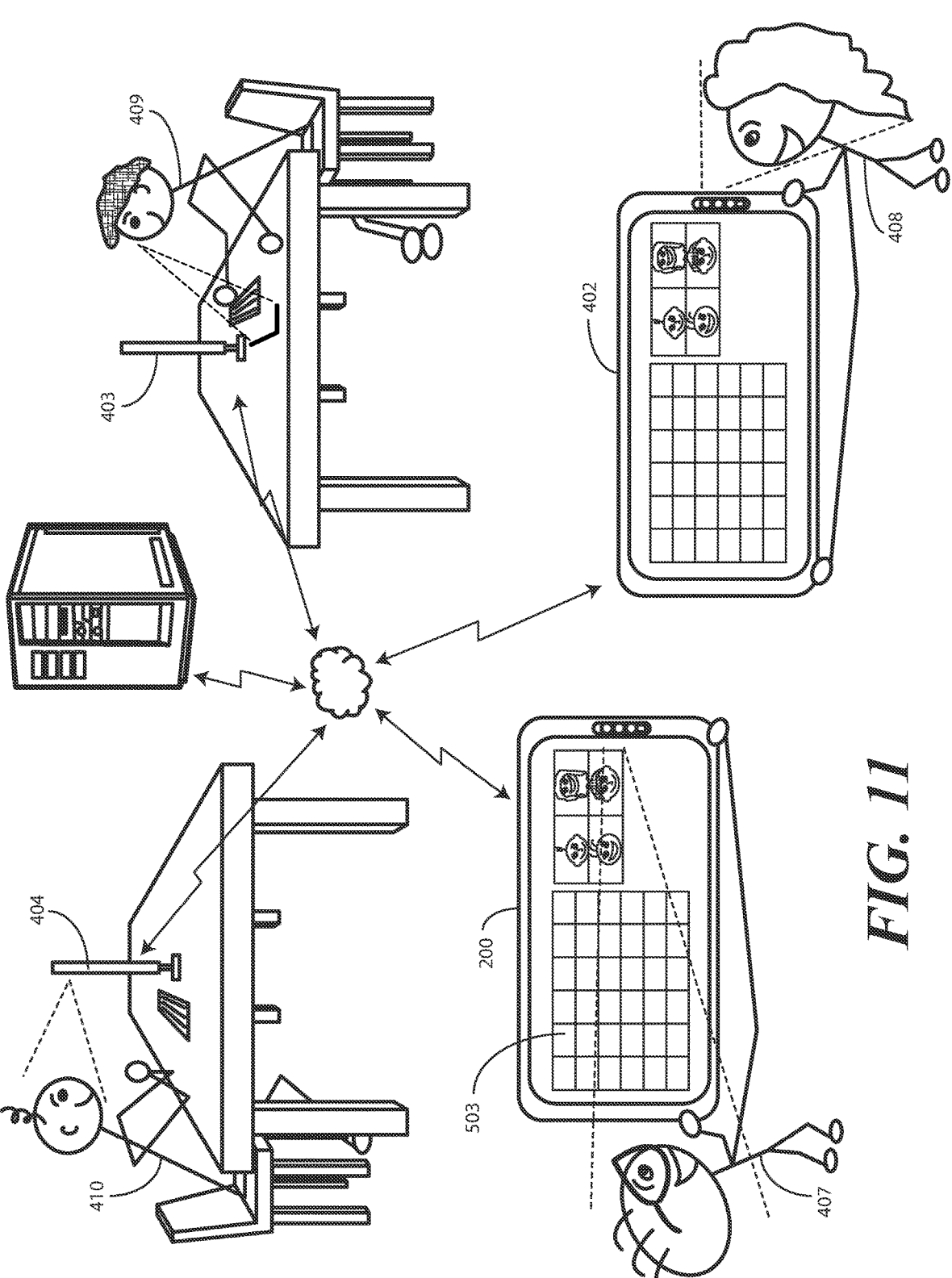
FIG. 11 illustrates one explanatory videoconference system in accordance with one or more embodiments of the disclosure.

Participant 407 could have selected the content prior to delivering the user input 905 as was described above in the example set forth in FIGS. 5-7. However, in this illustrative embodiment, no such selection has been made. This is intentional, as FIGS. 9-11 show an alternate embodiment that can be used either with a content presentation companion device (405) or an augmented reality companion device 100. Accordingly, the method of FIGS. 9-11 could proceed exactly as did FIGS. 5-7 after the user input (505) was received, and the method of FIGS. 5-7 could proceed as does FIGS. 9-11 due to the fact that the content to be shared can be selected before, or after, the user input (505),905 is delivered requesting sharing. Thus, the description of FIGS. 5-7 is incorporated by reference and is applicable to FIGS. 9-11, while the description of FIGS. 9-11 is incorporated by reference and is app to FIGS. 5-7.

The system of FIGS. 9-11 allows participant 407 to make a selection of what content offering to share after delivering the user input 905 requesting that content be shared. In one or more embodiments, the user input 905 is delivered before any content offering is shared. In other embodiments, user input 905 is delivered after an initial content offering is shared. Of course, combinations of these two approaches can be used as well.

Turning now to FIG. 10, illustrated therein is one explanatory method 1000 illustrating how this can occur. Others will be obvious to those of ordinary skill in the art having the benefit of this disclosure.

At step 1001, one or more processors (204) of the conferencing system terminal device 200 receive the user input 905 requesting for content to be shared from the conferencing system terminal device 200 with one or more remote electronic devices. The one or more processors (204) detect at step 1001, during a videoconference, that a communication device (206) of the conferencing system terminal device 200 is in communication with both an augmented reality companion device 100 and the one or more remote electronic devices engaged in the videoconference.

At step 1002, prior to causing the communication device (206) to share the content with the one or more remote electronic devices during the videoconference, the one or more processors present, in a field of view 1004 of the augmented reality companion device 100, a content verification presentation 1005. As shown at step 1002, in one or more embodiments the conferencing system terminal device 200 is within the field of view 1004. So as not to obscure the participant's view of the conferencing system terminal device 200, in one or more embodiments the presentation of the content verification presentation 1005 results in an absence of overlap between the augmented reality images of the content verification presentation 1005 and the conferencing system terminal device 200.

In one or more embodiments, step 1002 presents the augmented reality images of the content verification presentation 1005 within the field of view 1004 with a carousel presentation around the conferencing system terminal device 200. As shown at step 1002, the carousel presentation defines a ring at least partially encircling the view of the conferencing system terminal device 200 through the augmented reality companion device 100. In one or more embodiments, the carousel presentation causes the augmented reality images of the content verification presentation 1005 to encircle the view of the conferencing system terminal device 200. However, other configurations for the carousel presentation can occur as well. Illustrating by example, the carousel presentation could cause the augmented reality images to define a square about the view of the conferencing system terminal device 200. Alternatively, the carousel presentation of step 1002 may be omitted, with the augmented reality images of the content verification presentation 1005 being presented above, to the side, or below the view of the conferencing system terminal device 200. Other configurations for the content verification presentation 1005 will be obvious to those of ordinary skill in the art having the benefit of this disclosure.

As shown at step 1002, in one or more embodiments the augmented reality images of the content verification presentation 1005 present a plurality of content offerings available to be shared with the one or more remote electronic devices engaged in the videoconference. As with the system of FIGS. 5-7, this plurality of content offerings can comprise one or more of an application 1006 actively operating on the one or more processors (204) of the conferencing system terminal device 200, a tab of a web browser 1007, an image 1008 of a display of the conferencing system terminal device 200 operating during the videoconference, a file manager 1009, or an application window 1010. Other examples of potential content offerings suitable for inclusion with the content verification presentation 1005 will be obvious to those of ordinary skill in the art having the benefit of this disclosure.

In one or more embodiments, step 1002 comprises receiving a selection 1011 of the content to be shared from the plurality of content offerings included with the content verification presentation 1005. The selection 1011 can be made in a number of ways. In one or more embodiments, the selection 1011 comprises the participant (407) gazing toward a particular content offering, with that gaze being detected by the augmented reality companion device 100. In another embodiment, the selection 1011 is made when the participant (407) makes a gesture toward a particular content offering within the field of view 1004. In another embodiment, the selection 1011 is made when the participant (407) delivers user input to the conferencing system terminal device 200. Other examples of how the selection 1011 can be made will be obvious to those of ordinary skill in the art having the benefit of this disclosure.

In one or more embodiments, the selection 1011 comprises, or occurs with, a content share confirmation. Said differently, in one or more embodiments a content share confirmation comprises the selection 1011. Accordingly, in one or more embodiments step 1002 further comprises receiving a content share confirmation in response to the content verification presentation 1005. In one or more embodiments, step 1002 comprises the one or more processors (204) of the conferencing system terminal device 200 precluding the communication device (206) of the conferencing system terminal device 200 from sharing any content until the content share confirmation is received. Step 1003 then comprises the one or more processors (204) of the conferencing system terminal device 200 causing the communication device (206) to share the selected content 1012 with the one or more remote electronic devices during the videoconference in response to receiving the content share confirmation at step 1002.

Turning now to FIG. 11, illustrated therein are the results of the method (1000) of FIG. 10. Participant 407 has selected a spreadsheet 503 as the content to be shared delivering a content share confirmation to the one or more processors (204) of the conferencing system terminal device 200. This causes the spreadsheet 503 to be shared with the other conferencing system terminal devices 402,403,404. As shown in FIG. 11, this results in the spreadsheet 503 being moved to the shared space of the videoconference. As shown on the display of conferencing system terminal device 402, this means the spreadsheet 503 is successfully being shown to other participants 408,409,410 in the shared space of the videoconference.

Accordingly, as shown in FIGS. 9-11, in one or more embodiments one or more processors (204) of a conferencing system terminal device 200 detect that a videoconference participant 407 is operating a conferencing system terminal device 200 that is in communication with an augmented reality companion device 100. The system then detects that the videoconference participant 407 is engaged in an active videoconference.

In one or more embodiments, the system then determines that the videoconference participant 407 would like to share content with the other conferencing system terminal devices 402,403,404. In one or more embodiments, one or more processors (204) of the conferencing system terminal device 200 then move all the active windows and/or a file explorer option to the content verification presentation 1005 that is presented in a non-overlapping manner with the view of the conferencing system terminal device 200 within that field of view 1004. This allows the participant 407 to privately preview the content and/or choose new content to be shared in the shared space of the videoconference. In one or more embodiments, this information presented in the field of view 1004 in a carousel presentation around the view of the conferencing system terminal device 200, although other configuration presentations will be obvious to those of ordinary skill in the art having the benefit of this disclosure.

Once a content share confirmation is received in response to the content verification presentation 1005, the system can move the active window selection from the field of view 1004 of the augmented reality companion device 100 to the shared space of the videoconference. Advantageously, presenting the content verification presentation 1005 within the field of view 1004 of the augmented reality companion device 100 avoids any obscuration or restriction of the video feeds of the participants 408,409,410 and/or any other content currently being shared with the other videoconference participants 408,409,410. The system does this by keeping the "to be shared" content private and visible only to the participant 407 requesting the share until the content share confirmation is received. Once the content share confirmation is received, the shared content is moved to the shared space and made visible to the remainder of the participants 408,409,410.

When the augmented reality companion device 100 has a field of view wider than the conferencing system terminal device 200 with which the augmented reality companion device 100 is in communication, the one or more processors (204) of the conferencing system terminal device 200 can move all the active windows and/or a file explorer option into a field of view 1004 of the augmented reality companion device 100 that is non-overlapping with the conferencing system terminal device 200 with which the augmented reality companion device 100 is operating. In one or more embodiments, these images are presented in a carousel presentation within the field of view 1004 of the augmented reality companion device 100 that at least partially encircles the view of the conferencing system terminal device 200. From this carousel presentation, the videoconference participant 407 can choose a new active window to be shared in the shared space. In one or more embodiments, the carousel presentation is presented as a content verification presentation 1005.

Presenting these available options to the participant 407 in the field of view 1004 of the augmented reality companion device 100 in a non-overlapping manner with the conferencing system terminal device 200—rather than in the shared space of the videoconference—prevents the available options from obscuring or restricting the content currently being shared in the shared space while the selection is being made. Once the sharing participant 407 provides a content share confirmation in response to the content verification presentation 1005, which can be in the form of a gesture, a gaze, or other selection of the content offerings, the system causes a communication device (206) of the conferencing system terminal device 200 to share the selected content with the other participants 408,409,410 of the videoconference.

Advantageously, moving the active window selection to the field of view 1004 of the augmented reality companion device 100 allows unshared content to remain private to the sharing participant 407 of the videoconference until the content share confirmation is delivered. Once the content share confirmation is delivered, the selected content can be moved to the shared space and made viewable to the other participants 408,409,410 of the videoconference.

Figure 12:
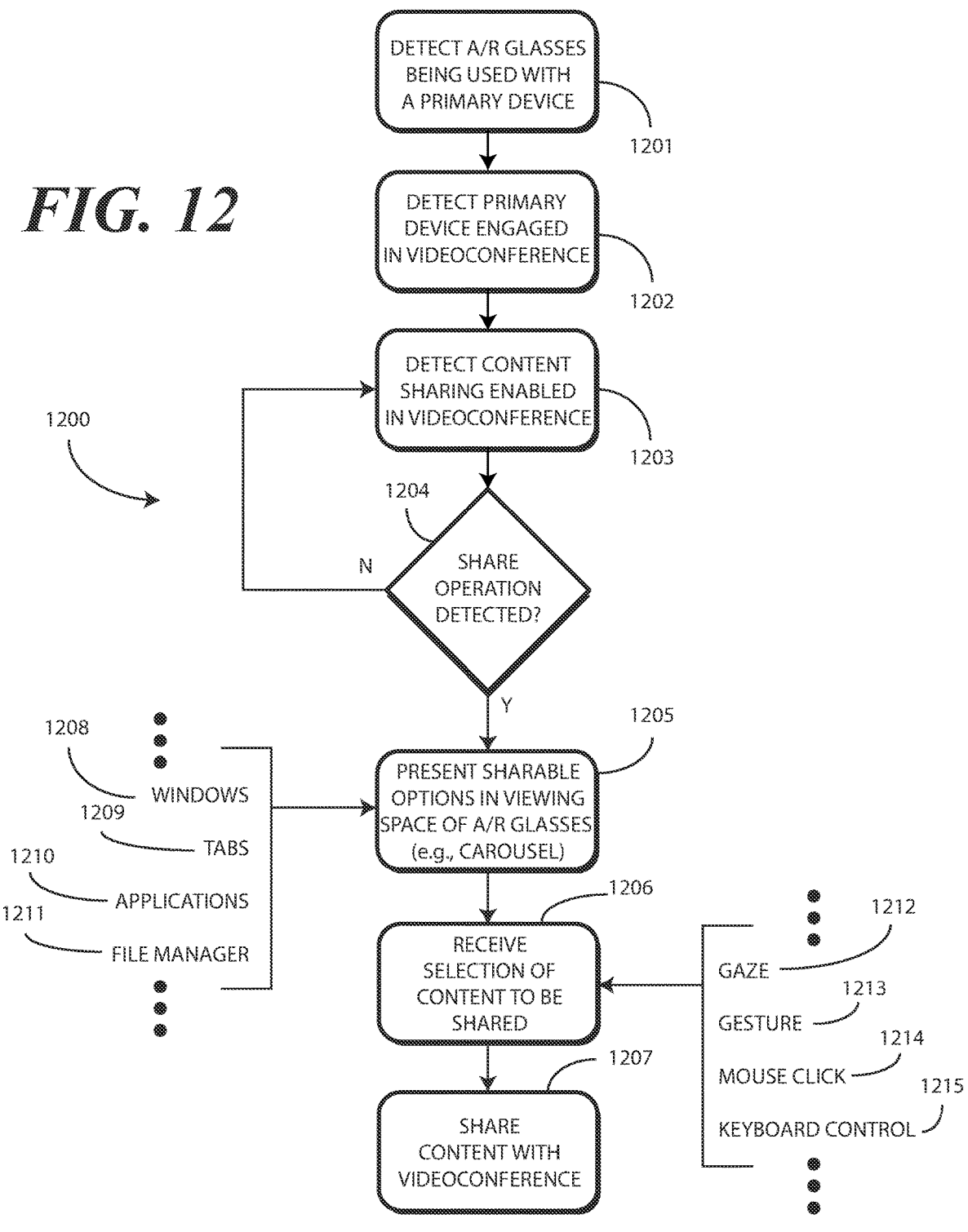
FIG. 12 illustrates one explanatory videoconference system in accordance with one or more embodiments of the disclosure.

Turning now to FIG. 12, illustrated therein is an explanatory method 1200 of performing the functions illustrated in FIGS. 9-11. Beginning with step 1201, one or more processors of a conferencing system terminal device detect a communication device in communication with both one or more remote electronic devices and an augmented reality companion device. At step 1202, the one or more processors detect that the conferencing system terminal device is engaged in a videoconference with the one or more remote electronic devices.

At step 1203, the one or more processors detect that content sharing capabilities have been enabled at the conferencing system terminal device. Step 1203 can optionally include detecting that a first content offering is actively being shared as well. Decision 1204 determines whether the one or more processors of the conferencing system terminal device receive user input requesting content (or an additional content offering if a first content offering is detected being shared at step 1203) be shared from the conferencing system terminal device to the one or more remote electronic devices.

Prior to causing the communication device of the conferencing system terminal device to share any content with the one or more remote electronic devices, step 1205 comprises presenting, in a field of view of the augmented reality companion device, a content verification presentation. In one or more embodiments, step 1205 comprises the one or more processors of the conferencing system terminal device preventing the communication device from performing the content sharing operation until a content share confirmation is received from either a user interface of the augmented reality companion device or another user interface of the conferencing system terminal device in response to the one or more processors causing the augmented reality companion device to present the content verification presentation. In one or more embodiments, the content verification presentation comprises one or more augmented reality images presented within a field of view of the augmented reality companion device.

In one or more embodiments, step 1205 comprises the one or more processors causing the one or more augmented reality images to be presented without overlapping eth conferencing system terminal device within the field of view. The content verification presentation presented at step 1205 can comprise a plurality of content offerings available to be shared during the content sharing operation. Examples include one or more of one or more of an application 1210 actively operating on the one or more processors, a tab 1209 of a web browser, an active window 1208 open on the conferencing system terminal device during the videoconference, a file manager 1211, or an application window. In one or more embodiments, each content offering of the plurality of content offerings corresponds to each augmented reality image of the plurality of augmented reality images on a one-to-one basis.

Step 1206 then comprises receiving a selection of the content to be shared from the plurality of content offerings. This can be made in a variety of ways, including gazing 1212 at a selected augmented reality image corresponding to the content that should be shared, making a gesture 1213 within the field of view, speaking into microphones of the augmented reality companion device to identify the selected content, or by using other techniques. Alternatively, the selection can be made by delivering user input to the augmented reality companion device, examples of which include a mouse click 1214 or keyboard control 1215. Other techniques for making the selection will be obvious to those of ordinary skill in the art having the benefit of this disclosure.

In one or more embodiments, the selection at step 1206 occurs in conjunction with the receipt of a content share confirmation. In other embodiments, step 1206 comprises first receiving the selection of the content offering and then receiving the content share confirmation. Once the content share confirmation is received, the one or more processors can share the content in the shared space of the videoconference with the other remote electronic devices at step 1207.

The method 1200 of FIG. 12 can be used with a system comprising a conferencing system terminal device engaged in a videoconference with both one or more remote electronic devices and an augmented reality companion device in communication with the conferencing system terminal device during the videoconference and comprising a display. Illustrating by example, decision 1204 can comprise one or more processors detecting receipt of user input requesting content sharing with the one or more remote electronic devices, while step 1205 can comprise presenting content offerings available for the content sharing in an orbit around the conferencing system terminal device within a field of view of the augmented reality companion device. Step 1205 can optionally comprise precluding the content sharing until a content share confirmation is received comprising a selected content offering from the orbit at step 1206.

Step 1207 can then comprise the one or more processors performing the content sharing of the selected content offering in response to the content share confirmation, and so forth. In one or more embodiments, step 1207 comprises causing an initial reveal of the selected content to the one or more remote electronic devices during the videoconference. For instance, there was no shared content occurring in FIG. 9 above, while the delivery of the content share confirmation caused the spreadsheet (503) to be revealed in FIG. 11.

Figure 13:
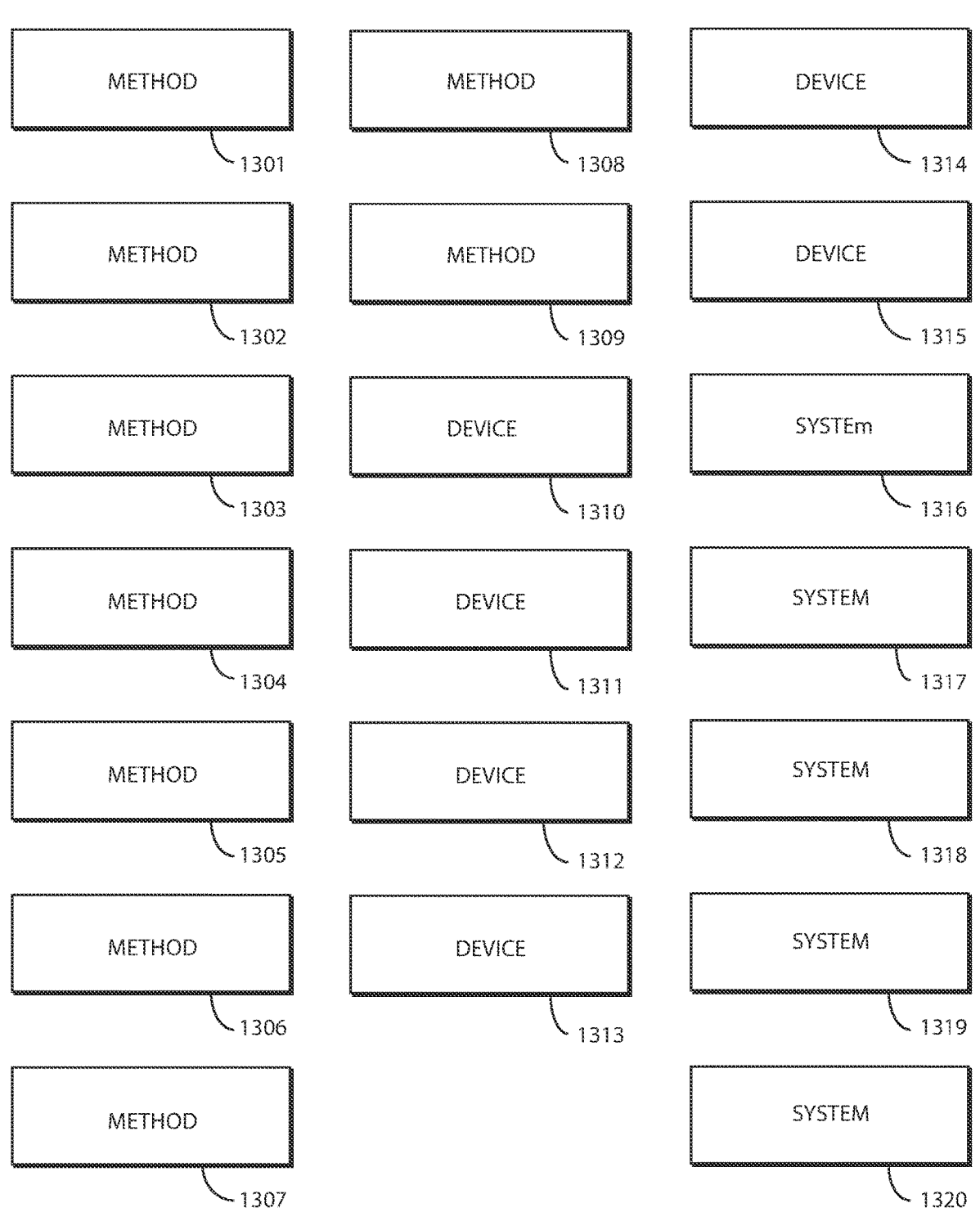
FIG. 13 illustrates one or more embodiments of the disclosure.
Figure 14:
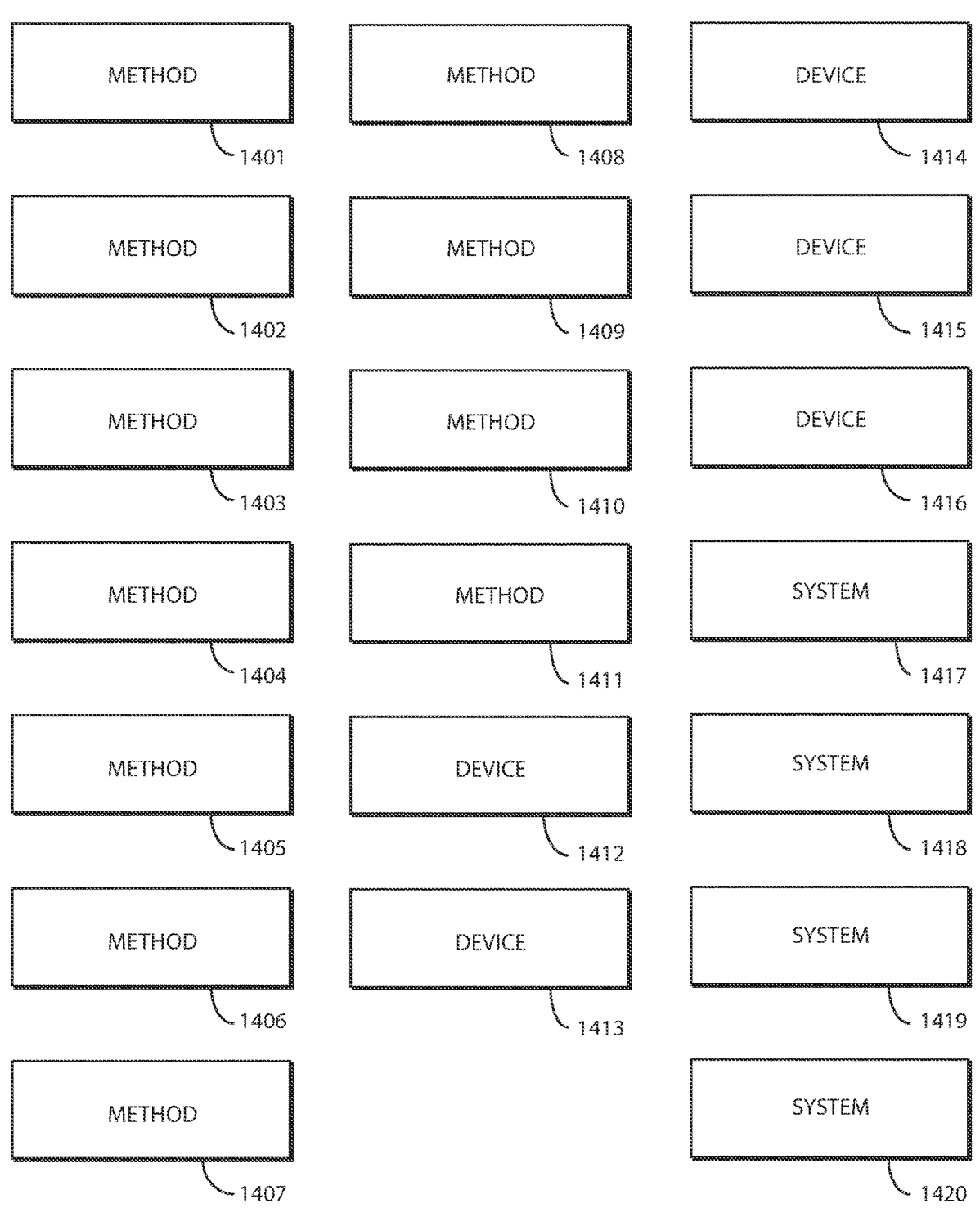
FIG. 14 illustrates one or more embodiments of the disclosure.

Turning now to FIGS. 13-14, illustrated therein are various embodiments of the disclosure. The embodiments of FIGS. 13-14 are shown as labeled boxes in FIGS. 13-14 due to the fact that the individual components of these embodiments have been illustrated in detail in FIGS. 1-12, which precede FIGS. 13-14. Accordingly, since these items have previously been illustrated and described, their repeated illustration is no longer essential for a proper understanding of these embodiments. Thus, the embodiments are shown as labeled boxes.

At 1301, a method in a conferencing system terminal device comprises detecting, with one or more processors during a videoconference, a communication device electronically in communication with both a content presentation companion device having a display and one or more remote electronic devices engaged in the videoconference.

At 1301, the method comprises receiving, with a user interface, user input requesting for content to be shared from the conferencing system terminal device with the one or more remote electronic devices engaged in the videoconference. At 1301, prior to causing the communication device to share the content with the one or more remote electronic devices during the videoconference, the method comprises presenting, on the display of the content presentation companion device, a content verification presentation and receiving, by another user interface of the content presentation companion device, a content share confirmation in response to the content verification presentation.

At 1302, the method of 1301 further comprises causing, by the one or more processors, the communication device to share the content with the one or more remote electronic devices during the videoconference in response to receiving the content share confirmation. At 1303, the method of 1302 further comprises precluding, by the one or more processors, the communication device from sharing the content with the one or more remote electronic devices during the videoconference until the content share confirmation is received at the another user interface of the content presentation companion device.

At 1304, the content verification presentation of 1303 presents the content on the display of the content presentation companion device. At 1305, the content verification presentation of 1303 presents a plurality of content offerings available to be shared with the one or more remote electronic devices engaged in the videoconference. At 1306, the plurality of content offerings presented at 1305 comprise one or more of an application actively operating on the one or more processors, a tab of a web browser, an image of another display of the conferencing system terminal device while operating during the videoconference, a file manager, or an application window.

At 1307, the method of 1305 further comprises receiving a selection of the content from the plurality of content offerings at the display of the content presentation companion device. AT 1308, the content share confirmation of 1307 comprises a selection of the content from the plurality of content offerings.

At 1309, the content of 1303 as at least partially obscured on another display of the conferencing system terminal device when the user input requesting the content be shared with the one or more remote electronic devices is received.

At 1310, a conferencing system terminal device comprises a communication device in communication with both one or more remote electronic devices during a videoconference and a content presentation companion device. At 1301, the conferencing system terminal device comprises a user interface receiving user input requesting the communication device share content from the conferencing system terminal device with the one or more remote electronic devices.

At 1310, the conferencing system terminal device comprises one or more processors operable with the communication device and the user interface. At 1310, the one or more processors prevent the communication device from sharing the content with the one or more remote electronic devices until a content share confirmation is received from the content presentation companion device in response to the one or more processors causing the communication device to present a content verification presentation on a display of the content presentation companion device.

At 1311, the content verification presentation of 1310 comprises a plurality of content offerings available to be shared as the content. At 1312, the content of 1311 is selected from the plurality of content offerings available from the content verification presentation. At 1313, the plurality of content offerings of 1311 comprises all applications actively operating on the one or more processors other than a videoconference application engaged in the videoconference.

At 1314, the plurality of content offerings of 1312 comprises an application selector operable to launch a selected application to render the content. At 1314, the one or more processors actuate the selected application in response to receiving the content share confirmation. At 1315, the content of 1310 is at least partially obscured by the videoconference when the user input requesting the communication device share the content.

At 1316, a system comprises a conferencing system terminal device engaged in a videoconference with one or more remote electronic devices. At 1316, the system comprises a content presentation companion device in communication with the conferencing system terminal device during the videoconference and comprising a display.

At 1316, the conferencing system terminal device comprises one or more processors receiving user input requesting content be shared from the conferencing system terminal device to the one or more remote electronic devices. At 1316, the one or more processors present the content on the display of the content presentation companion device for review and prevent sharing of the content until a content share confirmation is received from the content presentation companion device.

At 1317, the one or more processors of 1316 present an alternate content selector on the display of the content presentation companion device and precluding presentation of the content when the alternate content selector is actuated. At 1318, the one or more processors of 1317 present other content on the display of the content presentation companion device for review when the alternate content selector is actuated.

At 1319, the content presentation companion device comprises augmented reality glasses. At 1320, the one or more processors of 1316 leave the videoconference unobscured while the content is presented on the display of the content presentation companion device for review.

Turning now to FIG. 14, illustrated therein are other embodiments of the disclosure. At 1401, a method in a conferencing system terminal device comprises detecting, with one or more processors during a videoconference, a communication device electronically in communication with both an augmented reality companion device and one or more remote electronic devices engaged in the videoconference. At 1401, the method comprises receiving, with a user interface, user input requesting for content to be shared from the conferencing system terminal device with the one or more remote electronic devices engaged in the videoconference.

At 1401, and prior to causing the communication device to share the content with the one or more remote electronic devices during the videoconference, the method includes presenting, in a field of view of the augmented reality companion device, a content verification presentation. At 1401, the method comprises receiving, with the user interface, a content share confirmation in response to the content verification presentation.

At 1402, when the conferencing system terminal device of 1401 is within the field of view, the presenting results in an absence of overlap between images of the content verification presentation and the conferencing system terminal device. At 1403, the images of the content verification presentation of 1402 are presented within the field of view with a carousel presentation around the conferencing system terminal device.

At 1404, the content verification presentation of 1401 presents a plurality of content offerings available to be shared with the one or more remote electronic devices engaged in the videoconference. At 1405, the method of 1404 further comprises receiving a selection of the content from the plurality of content offerings from the augmented reality companion device.

At 1406, the selection of 1405 comprises a gesture within the field of view. At 1407, the selection of 1405 comprises a gaze toward a content offering of the plurality of content offerings. At 1408, the selection of 1405 comprises a selection of the content from the plurality of content offerings.

At 1409, the plurality of content offerings of 1405 comprise one or more of an application actively operating on the one or more processors, a tab of a web browser, an image of a display of the conferencing system terminal device operating during the videoconference, a file manager, or an application window.

At 1410, the method of 1405 further comprises causing, by the one or more processors, the communication device to share the content with the one or more remote electronic devices during the videoconference in response to receiving the content share confirmation. At 1411, the method of 1410 further comprises precluding, by the one or more processors, the communication device from sharing the content with the one or more remote electronic devices during the videoconference until the content share confirmation is received.

At 1412, a conferencing system terminal device comprises a communication device in communication with both one or more remote electronic devices during a videoconference and an augmented reality companion device. At 1412, the conferencing system terminal device comprises a user interface receiving user input requesting the communication device perform a content share operation with the one or more remote electronic devices during the videoconference.

At 1412, the conferencing system terminal device comprises one or more processors operable with the communication device and the user interface. At 1412, the one or more processors prevent the communication device from performing the content sharing operation until a content share confirmation is received from the augmented reality companion device in response to the one or more processors causing the augmented reality companion device to present a content verification presentation as one or more augmented reality images within a field of view of the augmented reality companion device.

At 1413, the one or more processors of 1412 cause the one or more augmented reality images to be presented without overlapping the conferencing system terminal device in the field of view. At 1414, the content verification presentation of 1212 comprises a plurality of content offerings available to be shared during the content sharing operation. At 1415, the content of 1414 is selected for sharing during the content sharing operation from the plurality of content offerings available from the content verification presentation.

At 1416, the one or more augmented reality images of 1414 comprise a plurality of augmented reality images. At 1416, each content offering of the plurality of content offerings corresponds to each augmented reality image of the plurality of augmented reality images on a one-to-one basis.

At 1417, a system comprises a conferencing system terminal device engaged in a videoconference with one or more remote electronic devices. At 1417, the system comprises an augmented reality companion device in communication with the conferencing system terminal device during the videoconference and comprising a display.

At 1417, the conferencing system terminal device comprises one or more processors receiving user input requesting content sharing with the one or more remote electronic devices. At 1417, the one or more processors presents content offerings available for the content sharing in an orbit around the conferencing system terminal device within a field of view of the augmented reality companion device, preclude the content sharing until a content share confirmation is received comprising a selected content offering from the orbit.

At 1418, the augmented reality companion device of 1417 comprises augmented reality glasses. At 1419, the one or more processors of 1417 perform the content sharing of the selected content offering in response to the content share confirmation. At 1420, the content sharing of 1419 causes an initial reveal of the selected content to the one or more remote electronic devices during the videoconference.

In the foregoing specification, specific embodiments of the present disclosure have been described. However, one of ordinary skill in the art appreciates that various modifications and changes can be made without departing from the scope of the present disclosure as set forth in the claims below. Thus, while preferred embodiments of the disclosure have been illustrated and described, it is clear that the disclosure is not so limited. Numerous modifications, changes, variations, substitutions, and equivalents will occur to those skilled in the art without departing from the spirit and scope of the present disclosure as defined by the following claims.

Accordingly, the specification and figures are to be regarded in an illustrative rather than a restrictive sense, and all such modifications are intended to be included within the scope of present disclosure. The benefits, advantages, solutions to problems, and any element(s) that may cause any benefit, advantage, or solution to occur or become more pronounced are not to be construed as a critical, required, or essential features or elements of any or all the claims.

What is claimed is:

1. A method in a conferencing system terminal device, the method comprising:

receiving, with a user interface, user input requesting for content to be shared from the conferencing system terminal device with one or more remote electronic devices engaged in a videoconference; and prior to causing a communication device to share the content with the one or more remote electronic devices during the videoconference:

presenting, on a display of a content presentation companion device or in a field of view of an augmented reality companion device in communication with the conferencing system terminal device, a content verification presentation; and receiving, by another user interface of the content presentation companion device or the user interface, a content share confirmation in response to the content verification presentation;

the content verification presentation presenting a plurality of content offerings available to be shared with the one or more remote electronic devices engaged in the videoconference.

2. The method of claim 1, further comprising causing, by one or more processors, the communication device to share the content with the one or more remote electronic devices during the videoconference in response to receiving the content share confirmation.

3. The method of claim 2, further comprising precluding, by the one or more processors, the communication device from sharing the content with the one or more remote electronic devices during the videoconference until the content share confirmation is received at the another user interface of the content presentation companion device.

4. The method of claim 1, wherein the presenting comprises presenting the content verification presentation in the field of view of the augmented reality companion device and, when the conferencing system terminal device is within the field of view, the presenting results in an absence of overlap between images of the content verification presentation and the conferencing system terminal device.

5. The method of claim 4, wherein the images of the content verification presentation are presented within the field of view with a carousel presentation around the conferencing system terminal device.

6. The method of claim 4, the content share confirmation comprising a gesture within the field of view.

7. The method of claim 1, further comprising moving all actively operable applications and windows into the content verification presentation.

8. The method of claim 1, the plurality of content offerings comprising one or more of an application actively operating on one or more processors, a tab of a web browser, an image of another display of the conferencing system terminal device while operating during the videoconference, a file manager, or an application window.

9. The method of claim 1, the content share confirmation comprising a selection of the content from the plurality of content offerings.

10. The method of claim 1, wherein the content is at least partially obscured on another display of the conferencing system terminal device when the user input requesting the content be shared with the one or more remote electronic devices is received.

11. A conferencing system terminal device, comprising:

a user interface receiving user input requesting a communication device perform a content sharing operation with one or more remote electronic devices; and one or more processors operable with the communication device and the user interface, the one or more processors preventing a communication device from sharing content with the one or more remote electronic devices until a content share confirmation is received from a content presentation companion device or an augmented reality companion device in response to the one or more processors causing presentation of a content verification presentation on a display of the content presentation companion device or within a field of view of the augmented reality companion device;

the one or more processors causing presentation of the content verification presentation within the field of view of the augmented reality companion device without overlapping the conferencing system terminal device in the field of view.

12. The conferencing system terminal device of claim 11, wherein the user interface receives the user input during a videoconference.

13. The conferencing system terminal device of claim 11, the content verification presentation comprising one or more of an application operating on the one or more processors, a tab of a web browser, an active window open on the conferencing system terminal device, a file manager, and/or an application window.

14. The conferencing system terminal device of claim 11, the content verification presentation comprising a plurality of content offerings available to be shared as the content.

15. The conferencing system terminal device of claim 14, wherein the content is selected from the plurality of content offerings available from the content verification presentation.

16. The conferencing system terminal device of claim 14, wherein:

the plurality of content offerings comprises an application selector operable to launch a selected application to render the content; and the one or more processors actuate the selected application in response to receiving the content share confirmation.

17. A system, comprising a conferencing system terminal device comprising one or more processors receiving user input requesting content be shared from the conferencing system terminal device to one or more remote electronic devices, presenting the content in a content verification presentation using a content presentation companion device, and preventing sharing of the content until a content share confirmation is received from the content presentation companion device, the content verification presentation presenting a plurality of content offerings available to be shared with the one or more remote electronic devices.

18. The system of claim 17, wherein the content presentation companion device comprises augmented reality glasses.

19. The system of claim 17, the one or more processors presenting an alternate content selector on a display of the content presentation companion device and precluding presentation of the content when the alternate content selector is actuated.

20. The system of claim 17, the one or more processors leaving a videoconference unobscured while the content is presented using the content presentation companion device for review.

\* \* \* \* \*